United States Patent
Hu et al.

(10) Patent No.: US 12,177,851 B2
(45) Date of Patent: Dec. 24, 2024

(54) METHOD AND DEVICE RELATED TO MULTIPLEXING OF CONTROL INFORMATION BITS IN NODES USED FOR WIRELESS COMMUNICATION

(71) Applicants: Yang Hu, Shanghai (CN); Xiaobo Zhang, Shanghai (CN)

(72) Inventors: Yang Hu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 376 days.

(21) Appl. No.: 17/705,266

(22) Filed: Mar. 25, 2022

(65) Prior Publication Data

US 2022/0346085 A1   Oct. 27, 2022

(30) Foreign Application Priority Data

Apr. 26, 2021   (CN) .......................... 202110463933.4

(51) Int. Cl.
   H04W 72/04   (2023.01)
   H04W 72/21   (2023.01)
   H04W 72/56   (2023.01)

(52) U.S. Cl.
   CPC ........... *H04W 72/21* (2023.01); *H04W 72/56* (2023.01)

(58) Field of Classification Search
   CPC .............................. H04W 72/21; H04W 72/56
   See application file for complete search history.

(56) References Cited

U.S. PATENT DOCUMENTS

| | | | |
|---|---|---|---|
| 2017/0332352 A1* | 11/2017 | Sheng | .................... H04W 72/23 |
| 2018/0167932 A1 | 6/2018 | Papasakellariou | |
| 2019/0363843 A1* | 11/2019 | Gordaychik | .............. H04L 1/08 |
| 2020/0260331 A1* | 8/2020 | Guo | ....................... H04W 28/26 |

(Continued)

FOREIGN PATENT DOCUMENTS

| | | |
|---|---|---|
| CN | 107979439 A | 5/2018 |
| CN | 110167182 A | 8/2019 |
| CN | 111314033 A | 6/2020 |

OTHER PUBLICATIONS

First Office Action of Chinese patent application No. CN202110463933.4 dated Mar. 6, 2024.

(Continued)

*Primary Examiner* — Mewale A Ambaye

(57) ABSTRACT

Present disclosure provides a method and a device in nodes for wireless communication. A first receiver receives a first information block, the first information block being used to determine a first radio resource pool and a first code rate, where the first code rate is a non-negative number; and a first transmitter transmits a first signal, the first signal being used to carry a first bit block and a second bit block, the first bit block including at least one control information bit, the second bit block including at least one control information bit; herein, a radio resource occupied by the first signal belongs to the first radio resource pool, a number of PRBs occupied by the first signal in frequency domain is equal to a first number, the first number being no greater than a number of PRBs included by the first radio resource pool in frequency domain.

20 Claims, 4 Drawing Sheets

(56) References Cited

U.S. PATENT DOCUMENTS

| | | | |
|---|---|---|---|
| 2021/0136781 A1* | 5/2021 | Hosseini | H04W 72/569 |
| 2021/0167930 A1* | 6/2021 | Jeon | H04L 27/2607 |
| 2021/0258921 A1* | 8/2021 | Zhang | H04W 72/40 |
| 2021/0354701 A1* | 11/2021 | Lee | B60W 60/0016 |
| 2021/0368534 A1* | 11/2021 | Sato | H04W 72/569 |
| 2022/0210785 A1* | 6/2022 | Zhang | H04W 72/23 |

OTHER PUBLICATIONS

First Search Report of Chinese patent application No. CN202110463933.4 dated Mar. 5, 2024.

* cited by examiner

A starting PRB occupied by first signal in frequency domain is related to first parameter value
or
A starting PRB occupied by first signal in frequency domain is related to the number of bits comprised in second bit block
FIG. 10
The first node/the first receiver in the present disclosure —also receives→ first signaling
FIG. 11
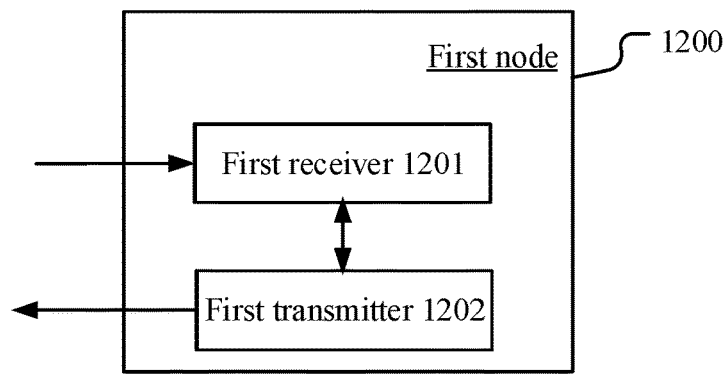
FIG. 12
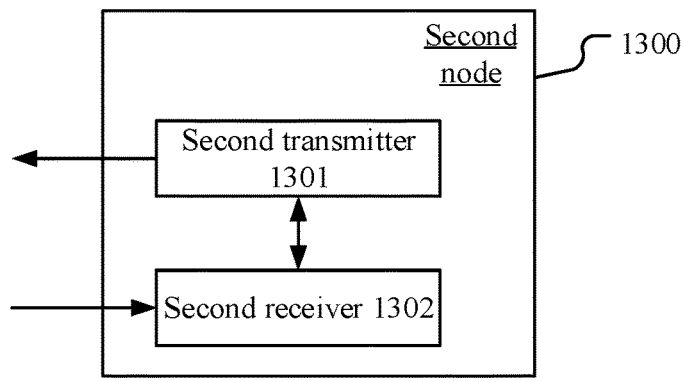
FIG. 13

METHOD AND DEVICE RELATED TO MULTIPLEXING OF CONTROL INFORMATION BITS IN NODES USED FOR WIRELESS COMMUNICATION

CROSS REFERENCE TO RELATED APPLICATIONS

This application claims the priority benefit of Chinese Patent Application No. 202110463933.4, filed on Apr. 26, 2021, the full disclosure of which is incorporated herein by reference.

BACKGROUND

Technical Field

The present disclosure relates to transmission methods and devices in wireless communication systems, and in particular to a method and device for radio signal transmission in a wireless communication system supporting cellular networks.

Related Art

In the 3rd Generation Partner Project (3GPP) system, in order to support Ultra Reliable and Low Latency Communications (URLLC) traffics with higher demands (such as higher reliability, and lower latency), the NR Release 16 protocols has already provided support for multiple kinds of advancement of uplink transmission.

A Work Item (WI) of further URLLC advancement in NR Release 17 was approved by the 3GPP RAN Plenary. The WI is proceeded with a focus of study on the Multiplexing of different intra-User-Equipment (Intra-UE) services.

SUMMARY

Against the above-mentioned background, how to process multiplexing among Uplink Control Information (UCI) of various priorities becomes a key issue to be solved.

To address the above problem, the present disclosure provides a solution. It should be noted that the above statement only takes URLLC for example, though, the present disclosure is also applicable to other scenarios, for instance, Enhanced Mobile Broadband (eMBB), sidelink, Internet of Things (IoT), V2X, non-terrestrial networks (NTN), Multicast and Broadcast Services (MBS), etc., where similar technical effects can be achieved. Additionally, the adoption of a unified solution for various scenarios, including but not limited to URLLC, eMBB, uplink, sidelink, IoT, V2X, NTN, and MBS, contributes to the reduction of hardcore complexity and costs, or an improvement in performance. It should be noted that if no conflict is incurred, embodiments in any node in the present disclosure and the characteristics of the embodiments are also applicable to any other node, and vice versa. What's more, the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:
  receiving a first information block, the first information block being used to determine a first radio resource pool and a first code rate, where the first code rate is a non-negative number; and
  transmitting a first signal, the first signal being used to carry a first bit block and a second bit block, the first bit block comprising at least one control information bit, the second bit block comprising at least one control information bit;
  herein, a radio resource occupied by the first signal belongs to the first radio resource pool, a number of physical resource blocks (PRBs) occupied by the first signal in frequency domain is equal to a first number, the first number being no greater than a number of PRBs comprised by the first radio resource pool in frequency domain; control information bit(s) comprised by the first bit block and control information bit(s) comprised by the second bit block are of different types; a number of bits (bit size) comprised in the first bit block, a first parameter value and the first code rate are jointly used to determine the first number, the first parameter value being a non-negative number which is pre-defined or configurable; the first bit block and the second bit block are jointly used to generate a first output bit sequence, the first output bit sequence comprising multiple bits; a number of bits comprised in the first output bit sequence is linear with the first number.

In one embodiment, a problem to be solved in the present disclosure comprises: how to determine the number of bits comprised by the first output bit sequence.

In one embodiment, a problem to be solved in the present disclosure comprises: how to determine a total length of a rate matching output bit sequence carrying UCI corresponding to various physical-layer priority indexes that is transmitted in a PUCCH resource.

In one embodiment, a problem to be solved in the present disclosure comprises: how to determine a total number of PRBs in a PUCCH resource used for bearing UCI of various priorities.

In one embodiment, a problem to be solved in the present disclosure comprises: how to determine a total number of PRBs used for bearing UCI corresponding to various physical-layer priority indexes in a PUCCH resource.

In one embodiment, the above method is advantageous in ensuring the transmission performance of high-priority (e.g., URLLC) UCI.

In one embodiment, an advantage of the above method includes multiplexing UCI corresponding to various priority indexes onto a same PUCCH respectively by means of coding.

In one embodiment, the above method is advantageous in reducing the influence of multiplexing of low-priority UCI on high-priority UCI.

In one embodiment, the above method is advantageous in avoiding potential misunderstandings on both sides of communications on the PUCCH resource.

According to one aspect of the present disclosure, the above method is characterized in that, the number of bits comprised in the first bit block is used together with the first parameter value to determine a first amount of calculation, while a second number is used to determine a third amount of calculation, the first amount of calculation being no greater than the third amount of calculation; the second number is no greater than a number of PRBs comprised by the first radio resource pool in frequency domain, or, the second number is determined by the first information block; the first number is related to the first amount of calculation.

According to one aspect of the present disclosure, the above method is characterized in that, a priority index for control information bit(s) comprised by the first bit block is equal to a first index, while a priority index for control information bit(s) comprised by the second bit block is equal to a second index, where the first index is a non-negative integer, and the second index is a non-negative integer; the first index and the second index are unequal, a sum of the number of control information bit(s) comprised by the first bit block and the number of control information bit(s) comprised by the second bit block is greater than 2.

In one embodiment, the characteristics of the above method include: only when the sum of the number of control information bit(s) comprised in the first bit block and the number of control information bit(s) comprised in the second bit block is greater than 2 can the number of bits comprised in the first bit block, the first parameter value and the first code rate be jointly used to determine a number of PRB(s) occupied by the first signal in frequency domain.

According to one aspect of the present disclosure, the above method is characterized in that, the first parameter value is equal to one of X1 candidate parameter values, X1 being a positive integer greater than 1; a given parameter value is equal to one of the X1 candidate parameter values, the first parameter value and the given parameter value being unequal is used to determine that the first signal carries the first bit block and the second bit block.

According to one aspect of the present disclosure, the above method is characterized in that, a relative magnitude between the number of bits comprised in the second bit block and a first threshold is used to determine a way in which the second bit block is used to generate the first output bit sequence, where the first threshold is a non-negative integer; the first threshold is pre-defined, or the first threshold is configurable, or the first threshold is related to the first parameter value.

According to one aspect of the present disclosure, the above method is characterized in that, when the number of bits comprised in the second bit block is greater than the first threshold, the second bit block is used to generate a third bit block, a number of bits comprised in the third bit block is no greater than the first threshold, and the third bit block through channel coding is used to generate the first output bit sequence; when the number of bits comprised in the second bit block is no greater than the first threshold, the second bit block through channel coding is used to generate the first output bit sequence.

In one embodiment, characteristics of the above method include: when the number of bits comprised in the second bit block is greater than the first threshold, the first output bit sequence carries only partial information indicated by the second bit block; when the number of bits comprised in the second bit block is no greater than the first threshold, the first output bit sequence carries all information indicated by the second bit block.

In one embodiment, advantages of the above method include: optimizing the performance of reporting low-priority UCI on the premise of guaranteeing the performance of high-priority UCI transmission.

According to one aspect of the present disclosure, the above method is characterized in that, a starting PRB occupied by the first signal in frequency domain is related to the first parameter value, or, a starting PRB occupied by the first signal in frequency domain is related to a number of bits comprised in the second bit block.

In one embodiment, the characteristics of the above method include: the first parameter value or the number of bits comprised in the second bit block is used to determine a starting PRB occupied by the first signal in frequency domain.

In one embodiment, an advantage of the above method includes: improving the performance of the receiving end in executing blind detection.

The present disclosure provides a method in a second node for wireless communications, comprising:

transmitting a first information block, the first information block being used to determine a first radio resource pool and a first code rate, where the first code rate is a non-negative number; and receiving a first signal, the first signal being used to carry a first bit block and a second bit block, the first bit block comprising at least one control information bit, the second bit block comprising at least one control information bit;

herein, a radio resource occupied by the first signal belongs to the first radio resource pool, a number of physical resource blocks (PRBs) occupied by the first signal in frequency domain is equal to a first number, the first number being no greater than a number of PRBs comprised by the first radio resource pool in frequency domain; control information bit(s) comprised by the first bit block and control information bit(s) comprised by the second bit block are of different types; a number of bits (bit size) comprised in the first bit block, a first parameter value and the first code rate are jointly used to determine the first number, the first parameter value being a non-negative number which is pre-defined or configurable; the first bit block and the second bit block are jointly used to generate a first output bit sequence, the first output bit sequence comprising multiple bits; a number of bits comprised in the first output bit sequence is linear with the first number.

According to one aspect of the present disclosure, the above method is characterized in that, the number of bits comprised in the first bit block is used together with the first parameter value to determine a first amount of calculation, while a second number is used to determine a third amount of calculation, the first amount of calculation being no greater than the third amount of calculation; the second number is no greater than a number of PRBs comprised by the first radio resource pool in frequency domain, or, the second number is determined by the first information block; the first number is related to the first amount of calculation.

According to one aspect of the present disclosure, the above method is characterized in that, a priority index for control information bit(s) comprised by the first bit block is equal to a first index, while a priority index for control information bit(s) comprised by the second bit block is equal to a second index, where the first index is a non-negative integer, and the second index is a non-negative integer; the first index and the second index are unequal, a sum of the number of control information bit(s) comprised by the first bit block and the number of control information bit(s) comprised by the second bit block is greater than 2.

According to one aspect of the present disclosure, the above method is characterized in that, the first parameter value is equal to one of X1 candidate parameter values, X1 being a positive integer greater than 1; a given parameter value is equal to one of the X1 candidate parameter values, the first parameter value and the given parameter value being unequal is used to determine that the first signal carries the first bit block and the second bit block.

According to one aspect of the present disclosure, the above method is characterized in that, a relative magnitude between the number of bits comprised in the second bit block and a first threshold is used to determine a way in which the second bit block is used to generate the first output bit sequence, where the first threshold is a non-negative integer; the first threshold is pre-defined, or the first threshold is configurable, or the first threshold is related to the first parameter value.

According to one aspect of the present disclosure, the above method is characterized in that, when the number of bits comprised in the second bit block is greater than the first threshold, the second bit block is used to generate a third bit block, a number of bits comprised in the third bit block is no greater than the first threshold, and the third bit block through channel coding is used to generate the first output bit sequence; when the number of bits comprised in the second bit block is no greater than the first threshold, the second bit block through channel coding is used to generate the first output bit sequence.

According to one aspect of the present disclosure, the above method is characterized in that, a starting PRB occupied by the first signal in frequency domain is related to the first parameter value, or, a starting PRB occupied by the first signal in frequency domain is related to a number of bits comprised in the second bit block.

The present disclosure provides a first node for wireless communications, comprising:

a first receiver, receiving a first information block, the first information block being used to determine a first radio resource pool and a first code rate, where the first code rate is a non-negative number; and a first transmitter, transmitting a first signal, the first signal being used to carry a first bit block and a second bit block, the first bit block comprising at least one control information bit, the second bit block comprising at least one control information bit;

herein, a radio resource occupied by the first signal belongs to the first radio resource pool, a number of physical resource blocks (PRBs) occupied by the first signal in frequency domain is equal to a first number, the first number being no greater than a number of PRBs comprised by the first radio resource pool in frequency domain; control information bit(s) comprised by the first bit block and control information bit(s) comprised by the second bit block are of different types; a number of bits (bit size) comprised in the first bit block, a first parameter value and the first code rate are jointly used to determine the first number, the first parameter value being a non-negative number which is pre-defined or configurable; the first bit block and the second bit block are jointly used to generate a first output bit sequence, the first output bit sequence comprising multiple bits; a number of bits comprised in the first output bit sequence is linear with the first number.

The present disclosure provides a second node for wireless communications, comprising:

a second transmitter, transmitting a first information block, the first information block being used to determine a first radio resource pool and a first code rate, where the first code rate is a non-negative number; and a second receiver, receiving a first signal, the first signal being used to carry a first bit block and a second bit block, the first bit block comprising at least one control information bit, the second bit block comprising at least one control information bit;

herein, a radio resource occupied by the first signal belongs to the first radio resource pool, a number of physical resource blocks (PRBs) occupied by the first signal in frequency domain is equal to a first number, the first number being no greater than a number of PRBs comprised by the first radio resource pool in frequency domain; control information bit(s) comprised by the first bit block and control information bit(s) comprised by the second bit block are of different types; a number of bits (bit size) comprised in the first bit block, a first parameter value and the first code rate are jointly used to determine the first number, the first parameter value being a non-negative number which is pre-defined or configurable; the first bit block and the second bit block are jointly used to generate a first output bit sequence, the first output bit sequence comprising multiple bits; a number of bits comprised in the first output bit sequence is linear with the first number.

In one embodiment, the method in the present disclosure has the following advantages:

ensuring the transmission performance, for instance, the reliability of high-priority (e.g., URLLC) UCI;

multiplexing UCI corresponding to various priority indexes onto a same PUCCH respectively by means of coding;

reducing the influence of multiplexing of low-priority UCI on high-priority UCI;

avoiding potential misunderstandings on both sides of communications on the PUCCH resource;

optimizing the performance of reporting low-priority (e.g., eMBB) UCI on the premise of guaranteeing the performance of high-priority UCI transmission;

improving the performance of the receiving end in executing blind detection.

BRIEF DESCRIPTION OF THE DRAWINGS

Other features, objects and advantages of the present disclosure will become more apparent from the detailed description of non-restrictive embodiments taken in conjunction with the following drawings:

FIG. 10 illustrates a schematic diagram illustrating a starting PRB occupied by a first signal in frequency domain according to one embodiment of the present disclosure.

FIG. 11 illustrates a schematic diagram of a relation between a first node/first receiver and a first signaling according to one embodiment of the present disclosure.

FIG. 12 illustrates a structure block diagram of a processing device in a first node according to one embodiment of the present disclosure.

FIG. 13 illustrates a structure block diagram a processing device in a second node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
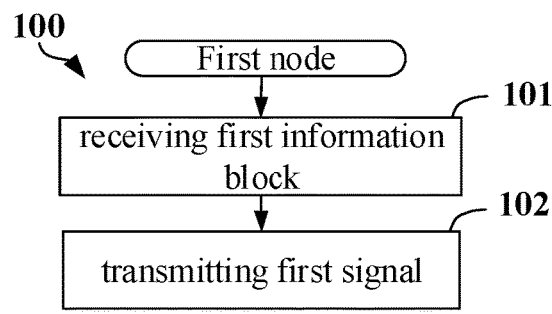
FIG. 1 illustrates a flowchart of processing of a first node according to one embodiment of the present disclosure.

Embodiment 1 illustrates a flowchart of processing of a first node according to one embodiment of the present disclosure, as shown in FIG. 1.

In Embodiment 1, the first node in the present disclosure receives a first information block in step 101; and transmits a first signal in step 102.

In Embodiment 1, the first information block is used to determine a first radio resource pool and a first code rate, the first code rate being a non-negative number; the first signal is used to carry a first bit block and a second bit block, the first bit block comprising at least one control information bit, the second bit block comprising at least one control information bit; a radio resource occupied by the first signal belongs to the first radio resource pool, a number of physical resource blocks (PRBs) occupied by the first signal in frequency domain is equal to a first number, the first number being no greater than a number of PRBs comprised by the first radio resource pool in frequency domain; control information bit(s) comprised by the first bit block and control information bit(s) comprised by the second bit block are of different types; a number of bits (bit size) comprised in the first bit block, a first parameter value and the first code rate are jointly used to determine the first number, the first parameter value being a non-negative number which is pre-defined or configurable; the first bit block and the second bit block are jointly used to generate a first output bit sequence, the first output bit sequence comprising multiple bits; a number of bits comprised in the first output bit sequence is linear with the first number.

In one embodiment, the first signal in the present disclosure comprises a radio signal.

In one embodiment, the first signal in the present disclosure comprises a radio frequency signal.

In one embodiment, the first signal in the present disclosure comprises a baseband signal.

In one embodiment, the phrase that the first signal is used to carry a first bit block and a second bit block means that: the first signal comprises an output by all or part of bits in the first bit block (or a bit block generated by the first bit block) sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion. Besides, the first signal also comprises an output by all or part of bits in the second bit block (or a bit block generated by the second bit block) sequentially through some or all of CRC Insertion, Segmentation, Code Block (CB)-level CRC Insertion, Channel Coding, Rate Matching, Concatenation, Scrambling, Modulation, Layer Mapping, Precoding, Mapping to Resource Element, Multicarrier Symbol Generation, and Modulation and Upconversion.

In one embodiment, the phrase that the first signal is used to carry a first bit block and a second bit block means that: the first signal is a signal bearing the first bit block (or a bit block generated by the first bit block) and the second bit block (or a bit block generated by the second bit block).

In one embodiment, a said radio resource pool in the present disclosure comprises at least one Resource Element (RE) in time-frequency domain.

In one embodiment, a said RE occupies a multicarrier symbol in time domain, and a subcarrier in frequency domain.

In one embodiment, the multicarrier symbol in the present disclosure is an Orthogonal Frequency Division Multiplexing (OFDM) Symbol.

In one embodiment, the multicarrier symbol in the present disclosure is a Single Carrier-Frequency Division Multiple Access (SC-FDMA) symbol.

In one embodiment, the multicarrier symbol in the present disclosure is a Discrete Fourier Transform Spread OFDM (DFT-S-OFDM) symbol.

In one embodiment, the multicarrier symbol in the present disclosure is a Filter Bank Multi Carrier (FBMC) symbol.

In one embodiment, the multicarrier symbol in the present disclosure comprises a Cyclic Prefix (CP).

In one embodiment, a said radio resource pool in the present disclosure comprises a positive integer number of subcarrier(s) in frequency domain.

In one embodiment, a said radio resource pool in the present disclosure comprises a positive integer number of Physical Resource Block(s) (PRB(s)) in frequency domain.

In one embodiment, a said radio resource pool in the present disclosure comprises a positive integer number of Resource Block(s) (RB(s)) in frequency domain.

In one embodiment, a said radio resource pool in the present disclosure comprises a positive integer number of multicarrier symbol(s) in time domain.

In one embodiment, a said radio resource pool in the present disclosure comprises a positive integer number of slot(s) in time domain.

In one embodiment, a said radio resource pool in the present disclosure comprises a positive integer number of sub-slot(s) in time domain.

In one embodiment, a said radio resource pool in the present disclosure comprises a positive integer number of millisecond(s) (ms) in time domain.

In one embodiment, a said radio resource pool in the present disclosure comprises a positive integer number of consecutive multicarrier symbols in time domain.

In one embodiment, a said radio resource pool in the present disclosure comprises a positive integer number of non-consecutive slots in time domain.

In one embodiment, a said radio resource pool in the present disclosure comprises a positive integer number of consecutive slots in time domain.

In one embodiment, a said radio resource pool in the present disclosure comprises a positive integer number of sub-frame(s) in time domain.

In one embodiment, a said radio resource pool in the present disclosure is indicated by a physical layer signaling or configured by a higher-layer signaling.

In one embodiment, a said radio resource pool in the present disclosure is indicated by DCI, or configured by a Radio Resource Control (RRC) signaling or configured by a Medium Access Control layer Control Element (MAC CE) signaling.

In one embodiment, a said radio resource pool in the present disclosure is reserved for an uplink physical layer channel.

In one embodiment, a said radio resource pool in the present disclosure comprises a radio resource occupied by an uplink physical layer channel.

In one embodiment, a said uplink physical layer channel in the present disclosure is a Physical Uplink Control CHannel (PUCCH) or a Physical Uplink Shared CHannel (PUSCH).

In one embodiment, a said radio resource pool in the present disclosure is a PUCCH resource.

In one embodiment, a said radio resource pool in the present disclosure is at least part of a PUCCH resource.

In one embodiment, the first radio resource pool in the present disclosure is a PUCCH resource.

In one embodiment, the first radio resource pool in the present disclosure is part of a PUCCH resource.

In one embodiment, the first information block comprises an RRC signaling.

In one embodiment, the first information block comprises an IE.

In one embodiment, the first information block is an IE.

In one embodiment, the first information block comprises one or more fields in an IE.

In one embodiment, the first information block comprises a MAC CE signaling.

In one embodiment, the first information block comprises a higher-layer signaling.

In one embodiment, the first information block is a PUCCH-config.

In one embodiment, the first information block is a PUCCH-configurationList.

In one embodiment, the first information block is a BWP-dedicated.

In one embodiment, the first information block is a sps-PUCCH-AN.

In one embodiment, the first information block is a sps-PUCCH-AN-ResourceID.

In one embodiment, the first information block's name includes PUCCH.

In one embodiment, the first information block's name includes PUCCH-config.

In one embodiment, the first information block indicates the first radio resource pool.

In one embodiment, the first information block explicitly indicates the first radio resource pool.

In one embodiment, the first information block implicitly indicates the first radio resource pool.

In one embodiment, the first radio resource pool is a radio resource pool in a radio resource pool set indicated by the first information block.

In one embodiment, the first information block indicates the first code rate.

In one embodiment, the first information block explicitly indicates the first code rate.

In one embodiment, the first information block implicitly indicates the first code rate.

In one embodiment, the first information block indicates that the first code rate is a code rate corresponding to the first radio resource pool.

In one embodiment, the first information block indicates that the first code rate is a maximum code rate corresponding to the first radio resource pool.

In one embodiment, the first code rate is a code rate in a code rate set indicated by the first information block.

In one embodiment, the first code rate is no greater than 1.

In one embodiment, the first code rate is one of 0.08, 0.15, 0.25, 0.35, 0.45, 0.60 or 0.80.

In one embodiment, the first radio resource pool comprises a PUCCH resource, the first code rate is a maximum code rate configured for a PUCCH format of the said PUCCH resource.

In one embodiment, the first code rate is a maximum code rate configured in a PUCCH-FormatConfig field.

In one embodiment, the first signal is a signal transmitted on a PUCCH.

In one embodiment, the first signal is a PUCCH.

In one embodiment, the first signal comprises a signal in one or more of multiple hops for a PUCCH transmission.

In one embodiment, the first bit block comprises at least one Hybrid Automatic Repeat reQuest ACKnowledgement (HARQ-ACK) information bit.

In one embodiment, the second bit block comprises at least one HARQ-ACK information bit.

In one embodiment, the first bit block only comprises a HARQ-ACK information bit.

In one embodiment, the second bit block only comprises a HARQ-ACK information bit.

In one embodiment, the first bit block also comprises a control information bit other than a HARQ-ACK bit.

In one embodiment, the second bit block also comprises a control information bit other than a HARQ-ACK bit.

In one embodiment, the first bit block does not comprise a Cyclic Redundancy Check (CRC) bit.

In one embodiment, the first bit block comprises at least one CRC bit.

In one embodiment, the second bit block does not comprise any CRC bit.

In one embodiment, the second bit block comprises at least one CRC bit.

In one embodiment, a said control information bit is a UCI bit.

In one embodiment, a said control information bit is a HARQ-ACK information bit.

In one embodiment, a said control information bit is a HARQ-ACK information bit or an SR bit.

In one embodiment, a said control information bit is a HARQ-ACK information bit or an SR bit or an indication bit for CSI report.

In one embodiment, a said control information bit is a bit carrying control information of higher-layer signaling.

In one embodiment, a said control information bit is an SCI bit.

In one embodiment, the first radio resource pool comprises a PUCCH resource.

In one embodiment, the first radio resource pool is a PUCCH resource.

In one embodiment, the first radio resource pool comprises a radio resource in a PUCCH resource that is occupied by one of multiple frequency-hopping intervals used for a PUCCH transmission.

In one embodiment, the phrase that control information bit(s) comprised by the first bit block and control information bit(s) comprised by the second bit block are of different types comprises a meaning that the control information bit(s) comprised by the first bit block and the control information bit(s) comprised by the second bit block are respectively for different service types.

In one embodiment, the phrase that control information bit(s) comprised by the first bit block and control information bit(s) comprised by the second bit block are of different types comprises a meaning that the control information bit(s) comprised by the first bit block and the control information bit(s) comprised by the second bit block are respectively control information bits for different transmission modes (for instance, broadcast, multicast, groupcast or unicast).

In one embodiment, the phrase that control information bit(s) comprised by the first bit block and control information bit(s) comprised by the second bit block are of different types comprises a meaning that the control information bit(s) comprised by the first bit block and the control information bit(s) comprised by the second bit block are respectively used for indicating control information on different links.

In one embodiment, the phrase that control information bit(s) comprised by the first bit block and control information bit(s) comprised by the second bit block are of different types comprises a meaning that the control information bit(s) comprised by the first bit block and the control information bit(s) comprised by the second bit block are respectively control information bits with varying priorities.

In one embodiment, the phrase that control information bit(s) comprised by the first bit block and control information bit(s) comprised by the second bit block are of different types comprises a meaning that the control information bit(s) comprised by the first bit block and the control information bit(s) comprised by the second bit block respectively correspond to the priority index 0 and the priority index 1.

In one embodiment, the phrase that control information bit(s) comprised by the first bit block and control information bit(s) comprised by the second bit block are of different types comprises a meaning that the control information bit(s) comprised by the first bit block and the control information bit(s) comprised by the second bit block respectively correspond to the priority index 1 and the priority index 0.

In one embodiment, the first output bit sequence comprises a first output bit sub-sequence and a second output bit sub-sequence; either the first bit block or a bit block generated by the first bit block is used for generating the first output bit sub-sequence, either the second bit block or a bit block generated by the second bit block is used for generating the second output bit sub-sequence.

In one embodiment, the first output bit sub-sequence is an output by the first bit block or a bit block generated by the first bit block sequentially through some or all of CRC Attachment, Segmentation, Code-block-level CRC Attachment, Channel Coding, Rate Matching, and Concatenation.

In one embodiment, the second output bit sub-sequence is an output by the second bit block or a bit block generated by the second bit block sequentially through some or all of CRC Attachment, Segmentation, Code-block-level CRC Attachment, Channel Coding, Rate Matching, and Concatenation.

In one embodiment, the first output bit sub-sequence comprises an output by the first bit block or a bit block generated by the first bit block sequentially through some or all of CRC Attachment, Segmentation, Code-block-level CRC Attachment, Channel Coding, Rate Matching, and Concatenation.

In one embodiment, the second output bit sub-sequence comprises an output by the second bit block or a bit block generated by the second bit block sequentially through some or all of CRC Attachment, Segmentation, Code-block-level CRC Attachment, Channel Coding, Rate Matching, and Concatenation.

In one embodiment, the first output bit sub-sequence is an output by the first bit block or a bit block generated by the first bit block sequentially through some or all of Channel Coding, Rate Matching, and Concatenation.

In one embodiment, the second output bit sub-sequence is an output by the second bit block or a bit block generated by the second bit block sequentially through some or all of Channel Coding, Rate Matching, and Concatenation.

In one embodiment, the first output bit sub-sequence comprises an output by the first bit block or a bit block generated by the first bit block sequentially through some or all of Channel Coding, Rate Matching, and Concatenation.

In one embodiment, the second output bit sub-sequence comprises an output by the second bit block or a bit block generated by the second bit block sequentially through some or all of Channel Coding, Rate Matching, and Concatenation.

In one embodiment, the first output bit sequence comprises an output by the first bit block or a bit block generated by the first bit block being concatenated with the second bit block or a bit block generated by the second bit block sequentially through some or all of CRC Insertion, Segmentation, Code-block-level CRC Insertion, Channel Coding, Rate Matching, and Concatenation.

In one embodiment, the first output bit sequence comprises one or more encoded bits.

In one embodiment, the first signal manages to carry the first bit block and the second bit block by carrying the first output bit sequence.

In one embodiment, the first signal manages to carry at least one of the first bit block or the second bit block by carrying the first output bit sequence.

In one embodiment, a bit block generated by the first bit block is: an output by at least partial bits in the first bit block through at least one of logic conjunction (logic and), logic disjunction (logic or), exclusive OR (XOR), repetition, deleting bits, or zero-padding operations.

In one embodiment, a bit block generated by the second bit block is: an output by at least partial bits in the second bit block through at least one of logic conjunction (logic and), logic disjunction (logic or), exclusive OR (XOR), repetition, deleting bits, or zero-padding operations.

In one embodiment, a bit block generated by the first bit block comprises: an output by at least partial bits in the first bit block through at least one of logic conjunction (logic and), logic disjunction (logic or), exclusive OR (XOR), repetition, deleting bits, or zero-padding operations.

In one embodiment, a bit block generated by the second bit block comprises: an output by at least partial bits in the second bit block through at least one of logic conjunction (logic and), logic disjunction (logic or), exclusive OR (XOR), repetition, deleting bits, or zero-padding operations.

In one embodiment, the first number is equal to a positive integer.

In one embodiment, the first number is equal to a number of PRBs occupied by the first signal in a hop in frequency domain.

In one embodiment, the first number is no greater than a number of PRBs occupied by the first signal in a hop in frequency domain.

In one embodiment, the first number is equal to a number of PRBs occupied by the first signal in a multicarrier symbol in frequency domain.

In one embodiment, the first number is no greater than a number of PRBs occupied by the first signal in a multicarrier symbol in frequency domain.

In one embodiment, a total number of bits comprised in the second bit block is no less than the first parameter value.

In one embodiment, the first parameter value is one of 0, 1, 2, 3, 4, 5, 6, 7 and 8.

In one embodiment, the first parameter value is equal to an integer among 0 through 1024.

In one embodiment, a number of PRBs comprised by the first radio resource pool in frequency domain refers to a number of PRBs comprised by the first radio resource pool in a multicarrier symbol in frequency domain.

In one embodiment, a number of PRBs comprised by the first radio resource pool in frequency domain refers to a number of PRBs comprised by the first radio resource pool in a hop in frequency domain.

In one embodiment, the statement in the claims that "the first parameter value being a non-negative number which is pre-defined or configurable" means that: the first parameter value is related to the first code rate, the first information block being used to configure the first code rate.

In one embodiment, the statement in the claims that "the first parameter value being a non-negative number which is pre-defined or configurable" means that: the first information block is used to configure the first code rate, which in turn is used to determine the first parameter value.

In one embodiment, the statement in the claims that "the first parameter value being a non-negative number which is pre-defined or configurable" means that: the first information block is used to configure the first code rate, the first parameter value is obtained by means of computing or deducing according to the first code rate.

In one embodiment, the statement in the claims that "the first parameter value being a non-negative number which is pre-defined or configurable" means that: the first information block is used to configure the first code rate, the first parameter value is obtained by means of computing or deducing according to the first code rate and a number of bits comprised in the first bit block.

In one embodiment, the statement in the claims that "the first parameter value being a non-negative number which is pre-defined or configurable" means that: the first parameter value is configured by the first information block or other information block(s).

In one embodiment, the first radio resource pool is a PUCCH resource adopting a PUCCH Format 2.

In one embodiment, the first radio resource pool is a PUCCH resource adopting a PUCCH Format 3.

In one embodiment, the first radio resource pool is a PUCCH resource adopting a PUCCH Format 4.

In one embodiment, a number of bits comprised in the second bit block is greater than the first parameter value.

In one embodiment, the number of the bits comprised in the first bit block, the first parameter value and the first code rate collectively indicate the first number.

In one embodiment, a sum of the number of the bits comprised in the first bit block and the first parameter value and the first code rate are jointly used to determine the first number.

In one embodiment, the number of bits comprised in the first bit block is used together with the first parameter value to determine a first amount of calculation, while a second number is used to determine a third amount of calculation; the second number is equal to a number of PRBs comprised by the first radio resource pool in frequency domain, or, the second number is determined by the first information block; when the first amount of calculation is larger than the third amount of calculation, the first number is equal to the second number; when the first amount of calculation is no larger than the third amount of calculation, the first number is related to the first amount of calculation.

In one embodiment, the number of bits comprised in the first bit block is used together with the first parameter value to determine a first amount of calculation, while a second number is used to determine a third amount of calculation; the second number is equal to a number of PRBs comprised by the first radio resource pool in frequency domain, or, the second number is determined by the first information block; when the first amount of calculation is no larger than the third amount of calculation, the first number is equal to the second number; when the first amount of calculation is larger than the third amount of calculation, the first number is related to the first amount of calculation.

In one embodiment, the number of bits comprised in the first bit block is used together with the first parameter value to determine a first amount of calculation, while a second number is used to determine a third amount of calculation; the second number is equal to a number of PRBs comprised by the first radio resource pool in frequency domain, or, the second number is determined by the first information block; when the first amount of calculation is smaller than the third amount of calculation, the first number is equal to the second number; when the first amount of calculation is no smaller than the third amount of calculation, the first number is related to the first amount of calculation.

In one embodiment, the number of bits comprised in the first bit block is used together with the first parameter value to determine a first amount of calculation, while a second number is used to determine a third amount of calculation;

the second number is equal to a number of PRBs comprised by the first radio resource pool in frequency domain, or, the second number is determined by the first information block; when the first amount of calculation is no smaller than the third amount of calculation, the first number is equal to the second number; when the first amount of calculation is smaller than the third amount of calculation, the first number is related to the first amount of calculation.

In one embodiment, a number of bits comprised in the first output bit sequence is equal to a first multiplier value multiplied by the first number and then by a second UCI symbol number and then divided by a first spreading factor.

In one embodiment, the first multiplier value is equal to a default or configured value.

In one embodiment, the first multiplier value is equal to 12.

In one embodiment, the first multiplier value is equal to 16.

In one embodiment, the first multiplier value is equal to 24.

In one embodiment, the second UCI symbol number is equal to the first UCI symbol number in the present disclosure.

In one embodiment, the second UCI symbol number is a number of UCI-bearing symbols in a PUCCH Format 2 or PUCCH Format 3.

In one embodiment, the second UCI symbol number is a number of UCI-bearing symbols in a PUCCH Format 4.

In one embodiment, the first spreading factor is a spreading factor in a PUCCH Format 2 or PUCCH Format 3.

In one embodiment, the first spreading factor is a spreading factor in a PUCCH Format 4.

In one embodiment, the first spreading factor is a positive integer.

In one embodiment, the first spreading factor is equal to a default or configurable value.

In one embodiment, the first spreading factor is a length of an orthogonal cover code (OCC).

In one embodiment, the first spreading factor is a length of an orthogonal cover code (OCC) comprised by a PUCCH resource adopting either a PUCCH Format 2 or a PUCCH Format 3.

In one embodiment, a number of bits comprised in the first output bit sequence is equal to a positive integral multiple of the first number.

In one embodiment, one or more fields comprised by the first information block is used for indicating a number of PRBs comprised in the first radio resource pool in frequency domain.

Embodiment 2

Figure 2:
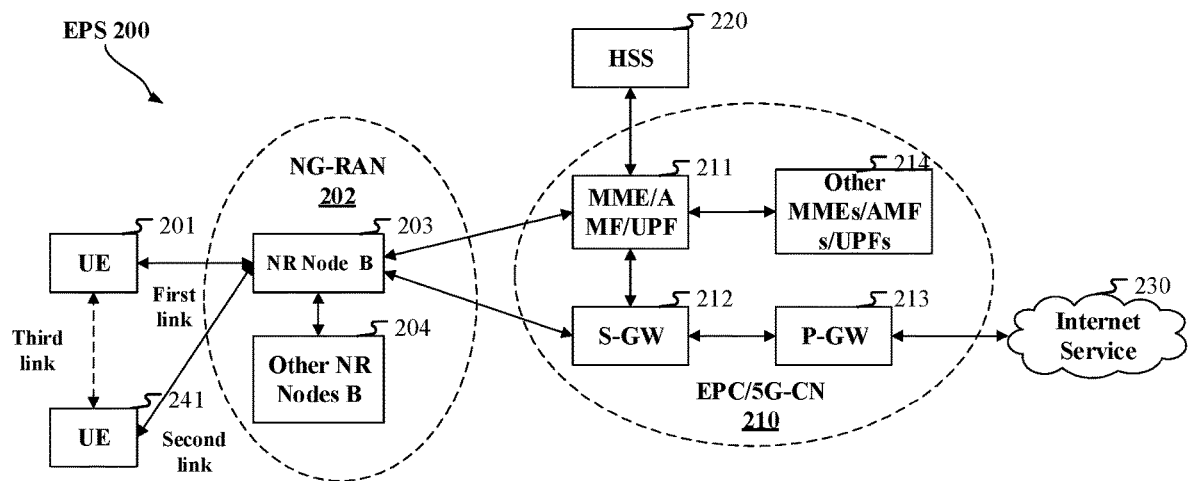
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 is a diagram illustrating a network architecture 200 of 5G NR, Long-Term Evolution (LTE) and Long-Term Evolution Advanced (LIE-A) systems. The 5G NR or LIE network architecture 200 may be called an Evolved Packet System (EPS) 200 or other suitable terminology. The EPS 200 may comprise one or more UEs 201, an NG-RAN 202, a Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an SING interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 241 corresponds to the second node in the present disclosure.

In one embodiment, the gNB 203 corresponds to the first node in the present disclosure.

In one embodiment, the gNB 203 corresponds to the second node in the present disclosure.

In one embodiment, the UE 241 corresponds to the first node in the present disclosure.

In one embodiment, the UE 201 corresponds to the second node in the present disclosure.

Embodiment 3

Figure 3:
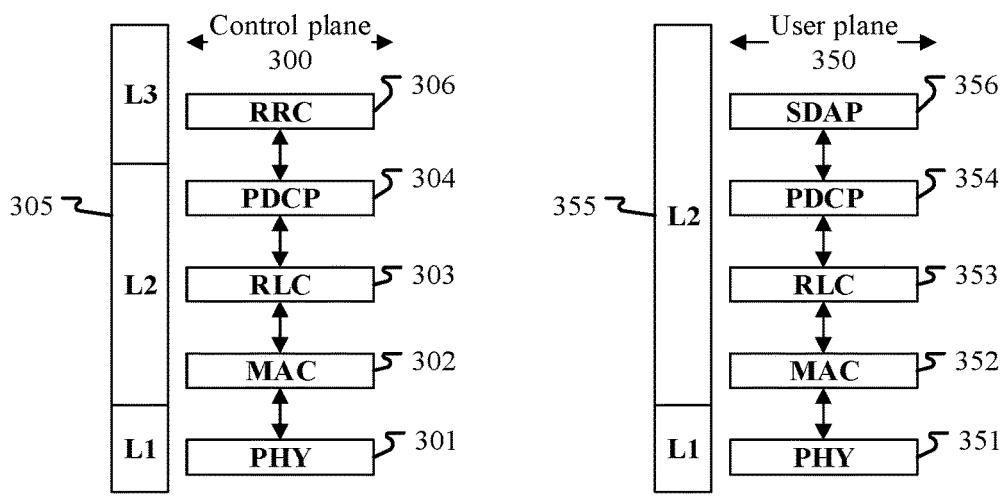
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG.

3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, i.e., layer 1, layer 2 and layer 3. The layer 1 (L1) is the lowest layer which performs signal processing functions of various PHY layers. The L1 is called PHY 301 in the present disclosure. The layer 2 (L2) 305 is above the PHY 301, and is in charge of the link between a first communication node and a second communication node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second communication nodes. The PDCP sublayer 304 provides multiplexing among variable radio bearers and logical channels. The PDCP sublayer 304 provides security by encrypting packets and also support for inter-cell handover of the first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information block in the present disclosure is generated by the RRC sublayer 306.

In one embodiment, the first information block in the present disclosure is generated by the MAC sublayer 302.

In one embodiment, the first information block in the present disclosure is generated by the MAC sublayer 352.

In one embodiment, the first signaling in the present disclosure is generated by the RRC sublayer 306.

In one embodiment, the first signaling in the present disclosure is generated by the MAC sublayer 302.

In one embodiment, the first signaling in the present disclosure is generated by the MAC sublayer 352.

In one embodiment, the first signaling in the present disclosure is generated by the PHY 301.

In one embodiment, the first signaling in the present disclosure is generated by the PHY 351.

In one embodiment, the first bit block in the present disclosure is generated by the MAC sublayer 302.

In one embodiment, the first bit block in the present disclosure is generated by the MAC sublayer 352.

In one embodiment, the first bit block in the present disclosure is generated by the PHY 301.

In one embodiment, the first bit block in the present disclosure is generated by the PHY 351.

In one embodiment, the second bit block in the present disclosure is generated by the MAC sublayer 302.

In one embodiment, the second bit block in the present disclosure is generated by the MAC sublayer 352.

In one embodiment, the second bit block in the present disclosure is generated by the PHY 301.

In one embodiment, the second bit block in the present disclosure is generated by the PHY 351.

In one embodiment, the first output bit sequence in the present disclosure is generated by the MAC sublayer 302.

In one embodiment, the first output bit sequence in the present disclosure is generated by the MAC sublayer 352.

In one embodiment, the first output bit sequence in the present disclosure is generated by the PHY 301.

In one embodiment, the first output bit sequence in the present disclosure is generated by the PHY 351.

In one embodiment, the first signal in the present disclosure is generated by the PHY 301.

In one embodiment, the first signal in the present disclosure is generated by the PHY 351.

Embodiment 4

Figure 4:
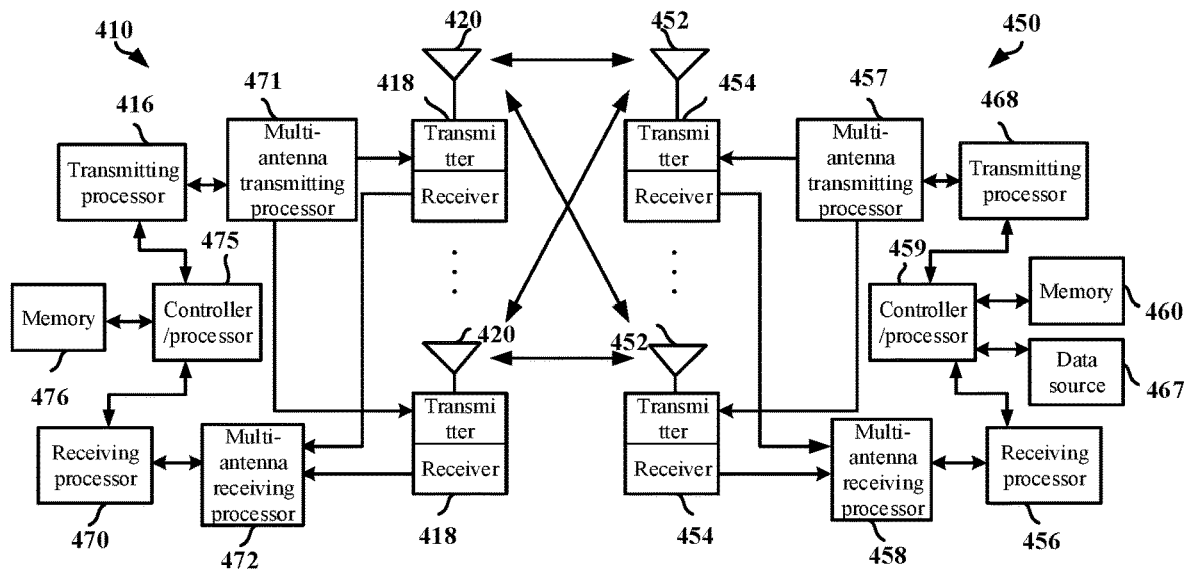
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In the transmission from the first communication device 410 to the second communication device 450, the controller/ processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450—targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication node 410 to the second communication node 450, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device (UE) 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment, the first node is a UE, and the second node is a UE.

In one subembodiment, the first node is a UE, and the second node is a relay node.

In one subembodiment, the first node is a relay node, and the second node is a UE.

In one subembodiment, the first node is a UE, and the second node is a base station.

In one subembodiment, the first node is a relay node, and the second node is a base station.

In one subembodiment, the second node is a UE, and the first node is a base station.

In one subembodiment, the second node is a relay node, and the first node is a base station.

In one subembodiment, the second communication device 450 comprises: at least one controller/processor; the at least one controller/processor is responsible for HARQ operation.

In one subembodiment, the first communication device 410 comprises: at least one controller/processor; the at least one controller/processor is responsible for HARQ operation.

In one subembodiment, the first communication device 410 comprises: at least one controller/processor; the at least one controller/processor is responsible for using ACK and/or NACK protocols for error checking as a way of supporting HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least receives the first information block in the present disclosure, the first information block being used to determine the first radio resource pool and the first code rate in the present disclosure, the first code rate being a non-negative number; transmits the first signal in the present disclosure, the first signal being used to carry the first bit block and the second bit block in the present disclosure, the first bit block comprising at least one control information bit, the second bit block comprising at least one control information bit; herein, a radio resource occupied by the first signal belongs to the first radio resource pool, a number of physical resource blocks (PRBs) occupied by the first signal in frequency domain is equal to the first number in the present disclosure, the first number being no greater than a number of PRBs comprised by the first radio resource pool in frequency domain; control information bit(s) comprised by the first bit block and control information bit(s) comprised by the second bit block are of different types; a number of bits (bit size) comprised in the first bit block, the first parameter value and the first code rate in the present disclosure are jointly used to determine the first number, the first parameter value being a non-negative number which is pre-defined or configurable; the first bit block and the second bit block are jointly used to generate the first output bit sequence in the present disclosure, the first output bit sequence comprising more than one bit; a number of bits comprised in the first output bit sequence is linear with the first number.

In one subembodiment, the second communication device 450 corresponds to the first node in the present disclosure.

In one embodiment, the second communication device 450 comprises a memory that stores a computer readable instruction program, the computer readable instruction program generates actions when executed by at least one processor, which include receiving the first information block in the present disclosure, the first information block being used to determine the first radio resource pool and the first code rate in the present disclosure, the first code rate being a non-negative number; transmitting the first signal in the present disclosure, the first signal being used to carry the first bit block and the second bit block in the present disclosure, the first bit block comprising at least one control information bit, the second bit block comprising at least one control information bit; herein, a radio resource occupied by the first signal belongs to the first radio resource pool, a number of physical resource blocks (PRBs) occupied by the first signal in frequency domain is equal to the first number in the present disclosure, the first number being no greater than a number of PRBs comprised by the first radio resource pool in frequency domain; control information bit(s) comprised by the first bit block and control information bit(s) comprised by the second bit block are of different types; a number of bits (bit size) comprised in the first bit block, the first parameter value and the first code rate in the present disclosure are jointly used to determine the first number, the first parameter value being a non-negative number which is pre-defined or configurable; the first bit block and the second bit block are jointly used to generate the first output bit sequence in the present disclosure, the first output bit sequence comprising more than one bit; a number of bits comprised in the first output bit sequence is linear with the first number.

In one subembodiment, the second communication device 450 corresponds to the first node in the present disclosure.

In one embodiment, the first communication device 410 comprises at least one processor and at least one memory. The at least one memory comprises computer program codes; the at least one memory and the computer program codes are configured to be used in collaboration with the at least one processor. The second communication device 410 at least transmits the first information block in the present disclosure, the first information block being used to determine the first radio resource pool and the first code rate in the present disclosure, the first code rate being a non-negative number; receives the first signal in the present disclosure, the first signal being used to carry the first bit block and the second bit block in the present disclosure, the first bit block comprising at least one control information bit, the second bit block comprising at least one control information bit; herein, a radio resource occupied by the first signal belongs to the first radio resource pool, a number of physical resource blocks (PRBs) occupied by the first signal in frequency domain is equal to the first number in the present disclosure, the first number being no greater than a number of PRBs comprised by the first radio resource pool in frequency domain; control information bit(s) comprised by the first bit block and control information bit(s) comprised by the second bit block are of different types; a number of bits (bit size) comprised in the first bit block, the first parameter value and the first code rate in the present disclosure are jointly used to determine the first number, the first parameter value being a non-negative number which is pre-defined or configurable; the first bit block and the second bit block are jointly used to generate the first output bit sequence in the present disclosure, the first output bit sequence comprising more than one bit; a number of bits comprised in the first output bit sequence is linear with the first number.

In one subembodiment, the first communication device 410 corresponds to the second node in the present disclosure.

In one embodiment, the first communication device 410 comprises a memory that stores a computer readable instruction program, the computer readable instruction program generates actions when executed by at least one processor, which include transmitting the first information block in the present disclosure, the first information block being used to determine the first radio resource pool and the first code rate in the present disclosure, the first code rate being a non-negative number; receiving the first signal in the present disclosure, the first signal being used to carry the first bit block and the second bit block in the present disclosure, the first bit block comprising at least one control information bit, the second bit block comprising at least one control information bit; herein, a radio resource occupied by the first signal belongs to the first radio resource pool, a number of physical resource blocks (PRBs) occupied by the first signal in frequency domain is equal to the first number in the present disclosure, the first number being no greater than a number of PRBs comprised by the first radio resource pool in frequency domain; control information bit(s) comprised by the first bit block and control information bit(s) comprised by the second bit block are of different types; a number of bits (bit size) comprised in the first bit block, the first parameter value and the first code rate in the present disclosure are jointly used to determine the first number, the first parameter value being a non-negative number which is pre-defined or configurable; the first bit block and the second bit block are jointly used to generate the first output bit sequence in the present disclosure, the first output bit sequence comprising more than one bit; a number of bits comprised in the first output bit sequence is linear with the first number.

In one subembodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used for receiving the first information block in the present disclosure.

In one embodiment, at least one of the antenna 420, the transmitter 418, the multi-antenna transmitting processor 471, the transmitting processor 416, the controller/processor 475 or the memory 476 is used for transmitting the first information block in the present disclosure.

In one embodiment, at least one of the antenna 452, the receiver 454, the multi-antenna receiving processor 458, the receiving processor 456, the controller/processor 459, the memory 460, or the data source 467 is used for receiving the first signaling in the present disclosure.

In one embodiment, at least one of the antenna 420, the transmitter 418, the multi-antenna transmitting processor 471, the transmitting processor 416, the controller/processor 475 or the memory 476 is used for transmitting the first signaling in the present disclosure.

In one embodiment, at least one of the antenna 452, the transmitter 454, the multi-antenna transmitting processor 468, the controller/processor 459, the memory 460 or the data source 467 is used for transmitting the first signal in the present disclosure.

In one embodiment, at least one of the antenna 420, the receiver 418, the multi-antenna receiving processor 472, the receiving processor 470, the controller/processor 475, or the memory 476 is used for receiving the first signal in the present disclosure.

Embodiment 5

Figure 5:
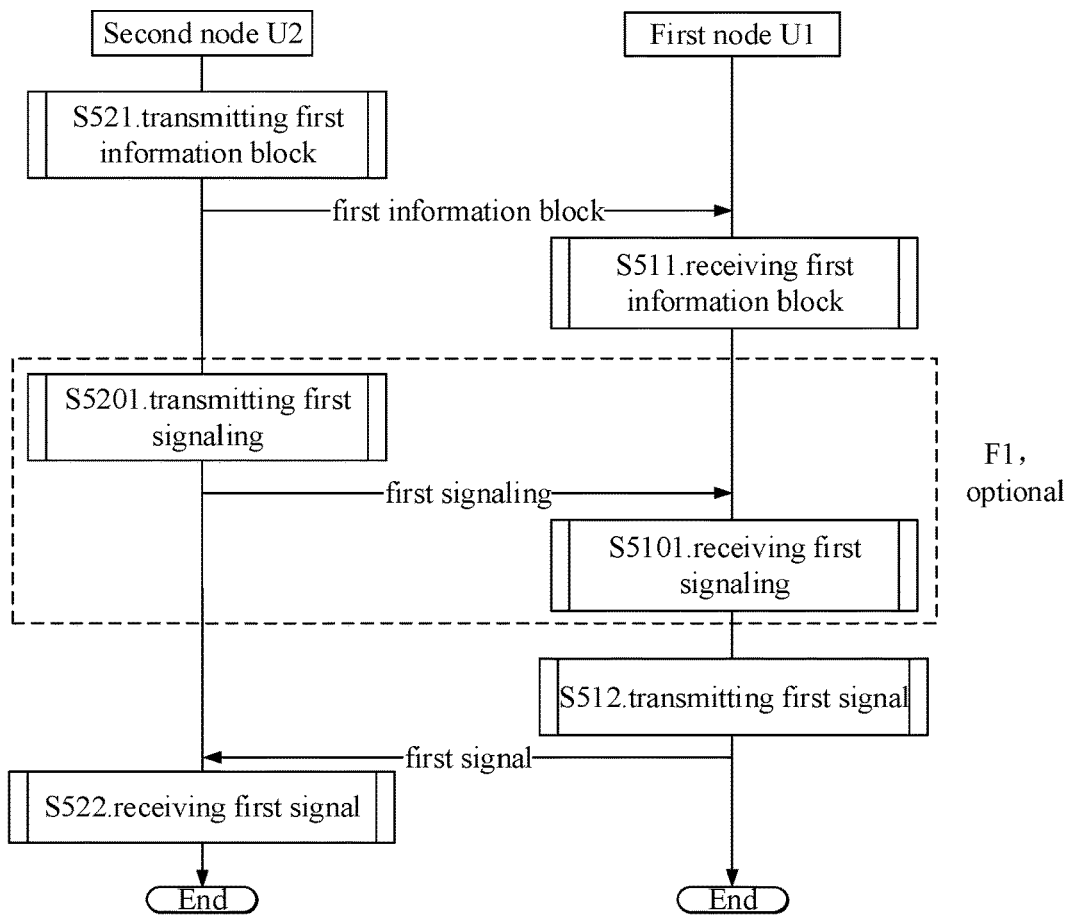
FIG. 5 illustrates a flowchart of signal transmission according to one embodiment of the present disclosure.

Embodiment 5 illustrates a flowchart of signal transmission according to one embodiment of the present disclosure, as shown in FIG. 5. In FIG. 5, a first node U1 and a second node U2 are in communications via an air interface. In FIG. 5, steps marked by the dotted-line frame box F1 are optional.

The first node U1 receives a first information block in step S511; receives a first signaling in step S5101; and transmits a first signal in step S512.

The second node U2 transmits a first information block in step S521; transmits a first signaling in step S5201; and receives a first signal in step S522.

In Embodiment 5, the first information block is used to determine a first radio resource pool and a first code rate, the first code rate being a non-negative number; the first signal is used to carry a first bit block and a second bit block, the first bit block comprising at least one control information bit, the second bit block comprising at least one control information bit; a radio resource occupied by the first signal belongs to the first radio resource pool, a number of physical resource blocks (PRBs) occupied by the first signal in frequency domain is equal to a first number, the first number being no greater than a number of PRBs comprised by the first radio resource pool in frequency domain; control information bit(s) comprised by the first bit block and control information bit(s) comprised by the second bit block are of different types; a number of bits (bit size) comprised in the first bit block, a first parameter value and the first code rate are jointly used to determine the first number, the first parameter value being a non-negative number which is pre-defined or configurable; the first bit block and the second bit block are jointly used to generate a first output bit sequence, the first output bit sequence comprising multiple bits; a number of bits comprised in the first output bit sequence is linear with the first number; the number of bits comprised in the first bit block is used together with the first parameter value to determine a first amount of calculation, while a second number is used to determine a third amount of calculation, the first amount of calculation being no greater than the third amount of calculation; the second number is no greater than a number of PRBs comprised by the first radio resource pool in frequency domain, or, the second number is determined by the first information block; the first number is related to the first amount of calculation; a priority index for control information bit(s) comprised by the first bit block is equal to a first index, while a priority index for control information bit(s) comprised by the second bit block is equal to a second index, where the first index is a non-negative integer, and the second index is a non-negative integer; the first index and the second index are unequal, a sum of the number of control information bit(s) comprised by the first bit block and the number of control information bit(s) comprised by the second bit block is greater than 2.

In one subembodiment of the Embodiment 5, a relative magnitude between the number of bits comprised in the second bit block and a first threshold is used to determine a way in which the second bit block is used to generate the first output bit sequence, where the first threshold is a non-negative integer; the first threshold is pre-defined, or the first threshold is configurable, or the first threshold is related to the first parameter value; when the number of bits comprised in the second bit block is greater than the first threshold, the second bit block is used to generate a third bit block, a number of bits comprised in the third bit block is no greater than the first threshold, and the third bit block through channel coding is used to generate the first output bit sequence; when the number of bits comprised in the second bit block is no greater than the first threshold, the second bit block through channel coding is used to generate the first output bit sequence.

In one subembodiment of the Embodiment 5, a starting PRB occupied by the first signal in frequency domain is related to the first parameter value, or, a starting PRB occupied by the first signal in frequency domain is related to a number of bits comprised in the second bit block.

In one subembodiment of the Embodiment 5, the first parameter value is equal to one of X1 candidate parameter values, X1 being a positive integer greater than 1; a given parameter value is equal to one of the X1 candidate parameter values, the first parameter value and the given parameter value being unequal is used to determine that the first signal carries the first bit block and the second bit block.

In one subembodiment of Embodiment 5, a third radio resource pool is reserved for the first bit block, while a second radio resource pool is reserved for the second bit block; the third radio resource pool and the second radio resource pool are overlapping in time domain.

In one subembodiment of Embodiment 5, the first radio resource pool belongs to a first radio resource pool set, the first radio resource pool set comprising at least one radio resource pool, the first signaling is used to determine the first radio resource pool from the first radio resource pool set; the first radio resource pool set is one of X2 candidate radio resource pool sets, X2 being a positive integer greater than 1; the first information block is used to determine the X2 candidate radio resource pool sets; at least one of a number of bits comprised in the first bit block or a number of bits comprised in the second bit block is used to determine the first radio resource pool set out of the X2 candidate radio resource pool sets.

In one embodiment, the first node U1 is the first node in the present disclosure.

In one embodiment, the second node U2 is the second node in the present disclosure.

In one embodiment, the first node U1 is a UE.

In one embodiment, the first node U1 is a base station.

In one embodiment, the second node U2 is a base station.

In one embodiment, the second node U2 is a UE.

In one embodiment, an air interface between the second node U2 and the first node U1 is a Uu interface.

In one embodiment, an air interface between the second node U2 and the first node U1 includes a cellular link.

In one embodiment, an air interface between the second node U2 and the first node U1 is a PC5 interface.

In one embodiment, an air interface between the second node U2 and the first node U1 includes a sidelink.

In one embodiment, an air interface between the second node U2 and the first node U1 includes a radio interface between a base station and a UE.

In one embodiment, an air interface between the second node U2 and the first node U1 includes a radio interface between a UE and another UE.

In one embodiment, a sum of a number of control information bit(s) comprised in the first bit block and a number of control information bit(s) comprised in the second bit block is greater than 2.

In one embodiment, the first parameter value is used to determine the first threshold.

In one embodiment, the first threshold is the first parameter value.

In one embodiment, the first threshold is equal to the first parameter value.

In one embodiment, the first threshold is not the first parameter value.

In one embodiment, the first threshold is no less than the first parameter value.

In one embodiment, the first threshold is no greater than the first parameter value.

In one embodiment, the first threshold is equal to 2.

In one embodiment, the first threshold is greater than 2.

In one embodiment, the first threshold is equal to 3.

In one embodiment, the first threshold is greater than 3.

In one embodiment, the first threshold is equal to 4.

In one embodiment, the first threshold is greater than 4.

In one embodiment, the first threshold is a positive integer no greater than 65536.

In one embodiment, when the number of bits comprised in the second bit block is less than the first threshold, the second bit block is used to generate a third bit block, a number of bits comprised in the third bit block is no less than the first threshold, and the third bit block through channel coding is used to generate the first output bit sequence; when the number of bits comprised in the second bit block is no less than the first threshold, the second bit block through channel coding is used to generate the first output bit sequence.

In one embodiment, when the number of bits comprised in the second bit block is no less than the first threshold, the second bit block is used to generate a third bit block, a number of bits comprised in the third bit block is no greater than the first threshold, and the third bit block through channel coding is used to generate the first output bit sequence; when the number of bits comprised in the second bit block is less than the first threshold, the second bit block through channel coding is used to generate the first output bit sequence.

In one embodiment, when the number of bits comprised in the second bit block is no greater than the first threshold, the second bit block is used to generate a third bit block, a number of bits comprised in the third bit block is no less than the first threshold, and the third bit block through channel coding is used to generate the first output bit sequence; when the number of bits comprised in the second bit block is greater than the first threshold, the second bit block through channel coding is used to generate the first output bit sequence.

In one embodiment, a third radio resource pool is reserved for the first bit block, while a second radio resource pool is reserved for the second bit block; the third radio resource pool and the second radio resource pool are overlapping in time domain.

In one embodiment, the first signaling indicates the third radio resource pool.

In one embodiment, the first signaling indicates the second radio resource pool.

In one embodiment, the third radio resource pool is a PUCCH resource.

In one embodiment, the second radio resource pool is a PUCCH resource.

In one embodiment, the steps marked by the dotted-line box F1 exist.

In one embodiment, the steps marked by the dotted-line box F1 do not exist.

Embodiment 6

Figure 6:
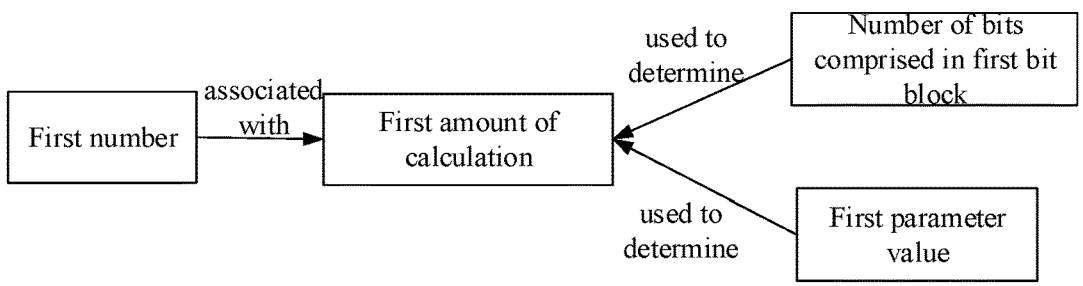
FIG. 6 illustrates a schematic diagram of relations between a number of bits comprised in a first bit block, a first parameter value, a first amount of calculation and a first number according to one embodiment of the present disclosure.

Embodiment 6 illustrates a schematic diagram of relations between a number of bits comprised in a first bit block, a first parameter value, a first amount of calculation and a first number according to one embodiment of the present disclosure, as shown in FIG. 6.

In Embodiment 6, the number of bits comprised in the first bit block is used together with the first parameter value to determine a first amount of calculation; the first number is related to the first amount of calculation.

In one embodiment, a second number is used to determine a third amount of calculation, the first amount of calculation being no greater than the third amount of calculation; the second number is no greater than a number of PRBs comprised by the first radio resource pool in frequency domain, or, the second number is determined by the first information block.

In one embodiment, the first amount of calculation is less than the third amount of calculation.

In one embodiment, the first number is no greater than the second number.

In one embodiment, the number of the bits comprised in the first bit block, the first parameter value and the first code rate are jointly used to determine the first amount of calculation.

In one embodiment, the second number is determined by the first information block.

In one embodiment, the second number is indicated by the first information block.

In one embodiment, the second number is inferred from all or partial information in the first information block.

In one embodiment, the second number is equal to a value of a nrofPRBs parameter.

In one embodiment, the second number is equal to a positive integer.

In one embodiment, the second number is equal to a number of PRBs comprised by the first radio resource pool in frequency domain.

In one embodiment, the second number is equal to a number of PRBs occupied by the first signal in a hop in frequency domain.

In one embodiment, the second number is equal to a number of PRBs occupied by the first signal in a multicarrier symbol in frequency domain.

In one embodiment, the first amount of calculation is equal to the number of the bits comprised in the first bit block plus the first parameter value.

In one embodiment, the first amount of calculation is equal to a sum of multiple values, where the multiple values include the number of the bits comprised in the first bit block and the first parameter value.

In one subembodiment, one of the multiple values is pre-defined.

In one subembodiment, one of the multiple values is configured.

In one subembodiment, one of the multiple values is obtained through calculation.

In one subembodiment, the multiple values also include a number of CRC bit(s).

In one embodiment, the first amount of calculation is equal to the number of the bits comprised in the first bit block being divided by the first code rate plus the first parameter value.

In one embodiment, the first amount of calculation is equal to a quotient yielded by the number of the bits comprised in the first bit block being divided by the first code rate rounded to a nearest integer plus the first parameter value.

In one embodiment, the first amount of calculation is no less than the number of the bits comprised in the first bit block plus the first parameter value.

In one embodiment, the first amount of calculation is no less than the number of the bits comprised in the first bit block being divided by the first code rate plus the first parameter value.

In one embodiment, the first amount of calculation is equal to a sum of the number of the bits comprised in the first bit block and the number of corresponding CRC bits being divided by the first code rate plus the first parameter value.

In one embodiment, the first amount of calculation is equal to a result yielded by a sum of the number of the bits comprised in the first bit block and the number of corresponding CRC bits being divided by the first code rate rounded to a nearest integer plus the first parameter value.

In one embodiment, the first amount of calculation is no less than a sum of the number of the bits comprised in the first bit block and the number of corresponding CRC bits plus the first parameter value.

In one embodiment, the first amount of calculation is no less than a sum of the number of the bits comprised in the first bit block and the number of corresponding CRC bits being divided by the first code rate plus the first parameter value.

In one embodiment, the first amount of calculation is no less than a result yielded by a sum of the number of the bits comprised in the first bit block and the number of corresponding CRC bits being divided by the first code rate rounded to a nearest integer plus the first parameter value.

In one embodiment, the phrase of rounding to a nearest integer in the present disclosure refers to: rounding up to a nearest integer.

In one embodiment, the phrase of rounding to a nearest integer in the present disclosure refers to: rounding down to a nearest integer.

In one embodiment, the third amount of calculation is obtained by means of computing or deducing according to the second number.

In one embodiment, the third amount of calculation is linear with the second number.

In one embodiment, the third amount of calculation is equal to a product of the second number, a first subcarrier number, a first UCI symbol number, a first modulation order and the first code rate.

In one embodiment, the third amount of calculation is equal to a product of the second number, a first subcarrier number, a first UCI symbol number, a first modulation order and the first code rate.

In one embodiment, the phrase that the first number is related to the first amount of calculation includes a meaning that the first number is equal to a number in a first number set that fulfills a first condition, the first condition being related to both the first code rate and the first amount of calculation, a maximum number in the first number set is no greater than the second number.

In one subembodiment, if a product of a number in the first number set, a first subcarrier number, a first UCI symbol number, a first modulation order and the first code rate is no smaller than the first amount of calculation, and a product of any other number in the first number set smaller than the said number, the first subcarrier number, the first UCI symbol number, the first modulation order and the first code rate is smaller than the first amount of calculation, the said number in the first number set is a number in the first number set that fulfills the first condition.

In one embodiment, the first number set comprises at least one number.

In one embodiment, in the first number set there is only one number that fulfills the first condition.

In one embodiment, a maximum number in the first number set is no greater than the second number.

In one embodiment, any number in the first number set is one of an integral power of 2, an integral power of 3 or an integral power of 5.

In one embodiment, the first number set only comprises all integral powers of 2, integral powers of 3 and integral powers of 5 of which each is no greater than the second number.

In one embodiment, the first number set comprises 1, 2 . . . N, where N is a positive integer no greater than the second number.

In one embodiment, the first number set comprises 1, 2 . . . N, where N is equal to the second number.

In one embodiment, the first number set comprises 1, 2 . . . N, where N is equal to a total number of PRBs comprised by the first radio resource pool in frequency domain.

In one embodiment, the phrase that the first number is related to the first amount of calculation includes a meaning that the first number is equal to a minimum number in a first number set which, multiplied by a first subcarrier number, a first UCI symbol number, a first modulation order and the first code rate, yields a product no smaller than the first amount of calculation, while a maximum number in the first number set is no greater than the second number.

In one embodiment, the phrase that the first number is related to the first amount of calculation includes a meaning that the first number is equal to a minimum number which is no greater than the second number and which, multiplied by a first subcarrier number, a first UCI symbol number, a first modulation order and the first code rate, yields a product no smaller than the first amount of calculation.

In one embodiment, the phrase that the first number is related to the first amount of calculation includes a meaning that the first number is equal to a minimum number in a first number set which, multiplied by a first subcarrier number, a first UCI symbol number and a first modulation order, yields a product no smaller than the first amount of calculation, while a maximum number in the first number set is no greater than the second number.

In one embodiment, the phrase that the first number is related to the first amount of calculation includes a meaning that the first number is equal to a minimum number which is no greater than the second number and which, multiplied by a first subcarrier number, a first UCI symbol number and a first modulation order, yields a product no smaller than the first amount of calculation.

In one embodiment, the phrase that the first number is related to the first amount of calculation includes a meaning that the first number is equal to a minimum number in a first number set that is no smaller than a value obtained by the first amount of calculation being divided by a first intermediate quantity, the first intermediate quantity being related to at least one of the first code rate, the first modulation order, the first subcarrier number or the first UCI symbol number, a maximum number in the first number set is no greater than the second number.

In one embodiment, the phrase that the first number is related to the first amount of calculation includes a meaning that the first number is equal to a minimum number no smaller than a value obtained by the first amount of calculation being divided by a first intermediate quantity, the first intermediate quantity being related to at least one of the first code rate, the first modulation order, the first subcarrier number or the first UCI symbol number.

In one embodiment, a said number in the present disclosure is a non-negative integer.

In one embodiment, the first subcarrier number is symbolized by $N_{sc,ctrl}^{RB}$.

In one embodiment, the first subcarrier number is equal to a number of subcarriers comprised in each resource block minus 4, or a difference of a number of subcarriers comprised in each resource block minus 4 being divided by an OCC length.

In one subembodiment, the above way of determining the first subcarrier number is for the PUCCH Format 2.

In one embodiment, the first subcarrier number is equal to a number of subcarriers comprised in each resource block, or a number of subcarriers comprised in each resource block being divided by an OCC length.

In one subembodiment, the above way of determining the first subcarrier number is for the PUCCH Format 3.

In one embodiment, the first subcarrier number is equal to a number of subcarriers comprised in each resource block being divided by an OCC length.

In one subembodiment, the above way of determining the first subcarrier number is for the PUCCH Format 4.

In one embodiment, the first UCI symbol number is represented by $N_{symb-UCI}^{PUCCH}$ In one embodiment, the first UCI symbol number is indicated by a nrofSymbols field.

In one embodiment, the first UCI symbol number is a number of UCI-bearing symbols in a PUCCH Format 2.

In one embodiment, the first UCI symbol number is a number of UCI-bearing symbols in a PUCCH Format 3.

In one embodiment, the first UCI symbol number is a number of symbols other than any symbol for DM-RS transmission in a PUCCH Format 3.

In one embodiment, the first UCI symbol number is a number of UCI-bearing symbols in a PUCCH Format 4.

In one embodiment, the first UCI symbol number is a number of symbols other than any symbol for DM-RS transmission in a PUCCH Format 4.

In one embodiment, the first modulation order is symbolized by $Q_m$.

In one embodiment, for a PUCCH Format 3 and a PUCCH Format 4: if the pi/2-BPSK modulation strategy is employed, the first modulation order is equal to 1; if the QPSK modulation strategy is employed, the first modulation order is equal to 2.

In one embodiment, for a PUCCH Format 2, the first modulation order is equal to 2.

In one embodiment, the first intermediate quantity is linearly correlated to at least one of the first code rate, the first modulation order, the first subcarrier number or the first UCI symbol number.

In one embodiment, the first intermediate quantity is equal to a product of the first code rate, the first modulation order, the first subcarrier number and the first UCI symbol number.

In one embodiment, the first intermediate quantity is equal to a product of the first modulation order, the first subcarrier number and the first UCI symbol number.

In one embodiment, the first intermediate quantity is equal to a product of the first modulation order and the first subcarrier number.

In one embodiment, the first intermediate quantity is equal to a product of the first modulation order and the first UCI symbol number.

In one embodiment, the first intermediate quantity is equal to a product of the first code rate and the first UCI symbol number.

In one embodiment, the first intermediate quantity is equal to a positive integral multiple of the first code rate.

Embodiment 7

Figure 7:
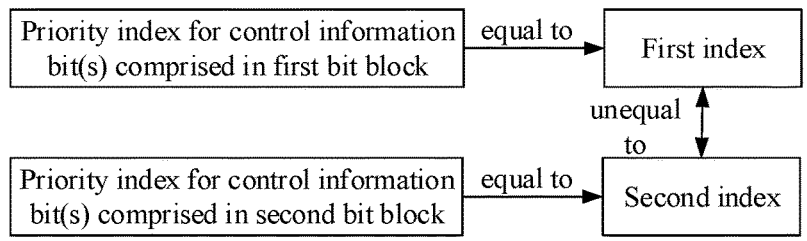
FIG. 7 illustrates a schematic diagram of relations between a priority index for control information bit(s) comprised in a first bit block, a first index, a priority index for control information bit(s) comprised in a second bit block and a second index according to one embodiment of the present disclosure.

Embodiment 7 illustrates a schematic diagram of relations between a priority index for control information bit(s) comprised in a first bit block, a first index, a priority index for control information bit(s) comprised in a second bit block and a second index according to one embodiment of the present disclosure, as shown in FIG. 7.

In Embodiment 7, a priority index for control information bit(s) comprised by the first bit block is equal to a first index, while a priority index for control information bit(s) comprised by the second bit block is equal to a second index, where the first index is a non-negative integer, and the second index is a non-negative integer; the first index and the second index are unequal.

In one embodiment, a sum of a number of control information bit(s) comprised in the first bit block and a number of control information bit(s) comprised in the second bit block is greater than 2.

In one embodiment, the first index is equal to 0, the second index is equal to 1.

In one embodiment, the first index is equal to 1, the second index is equal to 0.

In one embodiment, the first index is a Priority Index 0, while the second index is a Priority Index 1.

In one embodiment, the first index is a Priority Index 1, while the second index is a Priority Index 0.

In one embodiment, the first index indicates High Priority, while the second index indicates Low Priority.

In one embodiment, the second index indicates High Priority, while the first index indicates Low Priority.

In one embodiment, the priority indicated by the second index is higher than the priority indicated by the first index.

In one embodiment, the priority indicated by the second index is lower than the priority indicated by the first index.

In one embodiment, a priority index for control information bit(s) comprised in the first bit block and a priority index for control information bit(s) comprised in the second bit block are both physical-layer priority indexes.

In one embodiment, a priority index for control information bit(s) comprised in the first bit block and a priority index for control information bit(s) comprised in the second bit block are both higher-layer priority indexes.

In one embodiment, a number of control information bit(s) comprised in the first bit block is equal to 1, and a number of control information bit(s) comprised in the second bit block is greater than 1.

In one embodiment, a number of control information bit(s) comprised in the first bit block is greater than 1, and a number of control information bit(s) comprised in the second bit block is equal to 1.

In one embodiment, a number of control information bit(s) comprised in the first bit block is greater than 1, and a number of control information bit(s) comprised in the second bit block is greater than 1.

Embodiment 8

Figure 8:
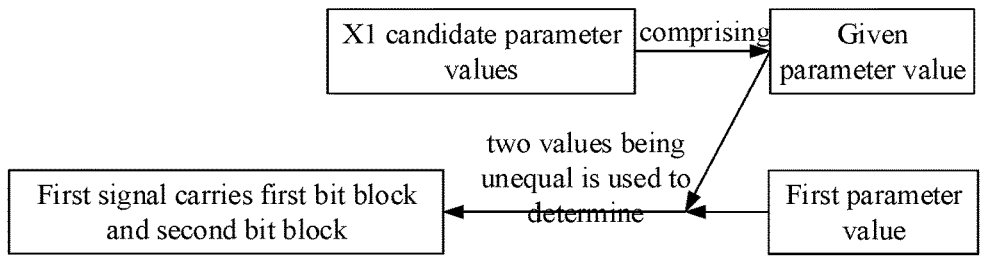
FIG. 8 illustrates a schematic diagram of relations between a first parameter value, a given parameter value, X1 candidate parameter values and bit block(s) carried by a first signal according to one embodiment of the present disclosure.

Embodiment 8 illustrates a schematic diagram of relations between a first parameter value, a given parameter value, X1 candidate parameter values and bit block(s) carried by a first signal according to one embodiment of the present disclosure, as shown in FIG. 8.

In Embodiment 8, the first parameter value is equal to one of X1 candidate parameter values, X1 being a positive integer greater than 1; a given parameter value is equal to one of the X1 candidate parameter values, the first parameter value and the given parameter value being unequal is used to determine that a first signal carries a first bit block and a second bit block.

In one embodiment, any of the X1 candidate parameter values is a non-negative integer.

In one embodiment, any of the X1 candidate parameter values is no less than 0.

In one embodiment, the given parameter value is equal to a pre-defined candidate parameter value among the X1 candidate parameter values.

In one embodiment, the given parameter value is equal to a configurable candidate parameter value among the X1 candidate parameter values.

In one embodiment, the first parameter value is configurable, the first information block being used to indicate the first parameter value out of the X1 candidate parameter values.

In one embodiment, the first parameter value is configurable, an information block other than the first information block being used to indicate the first parameter value out of the X1 candidate parameter values.

In one embodiment, the first parameter value is configurable, a DCI being used to indicate the first parameter value out of the X1 candidate parameter values.

In one embodiment, the first parameter value and the given parameter value being unequal indicates that the first signal carries the first bit block and the second bit block.

In one embodiment, the first parameter value and the given parameter value being unequal explicitly indicates that the first signal carries the first bit block and the second bit block.

In one embodiment, the first parameter value and the given parameter value being unequal implicitly indicates that the first signal carries the first bit block and the second bit block.

In one embodiment, the first parameter value and the given parameter value being equal is used to determine that the first signal does not carry the second bit block.

In one embodiment, the first parameter value and the given parameter value being equal is used to determine that the first signal does not carry the first bit block.

In one embodiment, the first parameter value and the given parameter value being equal indicates that the first signal does not carry the second bit block.

In one embodiment, the first parameter value and the given parameter value being equal indicates that the first signal does not carry the first bit block.

In one embodiment, the first parameter value and the given parameter value being equal explicitly indicates that the first signal does not carry the second bit block.

In one embodiment, the first parameter value and the given parameter value being equal explicitly indicates that the first signal does not carry the first bit block.

In one embodiment, the first parameter value and the given parameter value being equal implicitly indicates that the first signal does not carry the second bit block.

In one embodiment, the first parameter value and the given parameter value being equal implicitly indicates that the first signal does not carry the first bit block.

In one embodiment, the first parameter value and the given parameter value being equal is used to determine that the first signal carries only the first bit block of the first bit block and the second bit block.

In one embodiment, the first parameter value and the given parameter value being equal indicates that the first signal carries only the first bit block of the first bit block and the second bit block.

In one embodiment, the first parameter value and the given parameter value being equal explicitly indicates that the first signal carries only the first bit block of the first bit block and the second bit block.

In one embodiment, the first parameter value and the given parameter value being equal implicitly indicates that the first signal carries only the first bit block of the first bit block and the second bit block.

In one embodiment, the first parameter value and the given parameter value being equal is used to determine that the first signal carries only the second bit block of the first bit block and the second bit block.

In one embodiment, the first parameter value and the given parameter value being equal indicates that the first signal carries only the second bit block of the first bit block and the second bit block.

In one embodiment, the first parameter value and the given parameter value being equal explicitly indicates that the first signal carries only the second bit block of the first bit block and the second bit block.

In one embodiment, the first parameter value and the given parameter value being equal implicitly indicates that the first signal carries only the second bit block of the first bit block and the second bit block.

Embodiment 9

Figure 9:
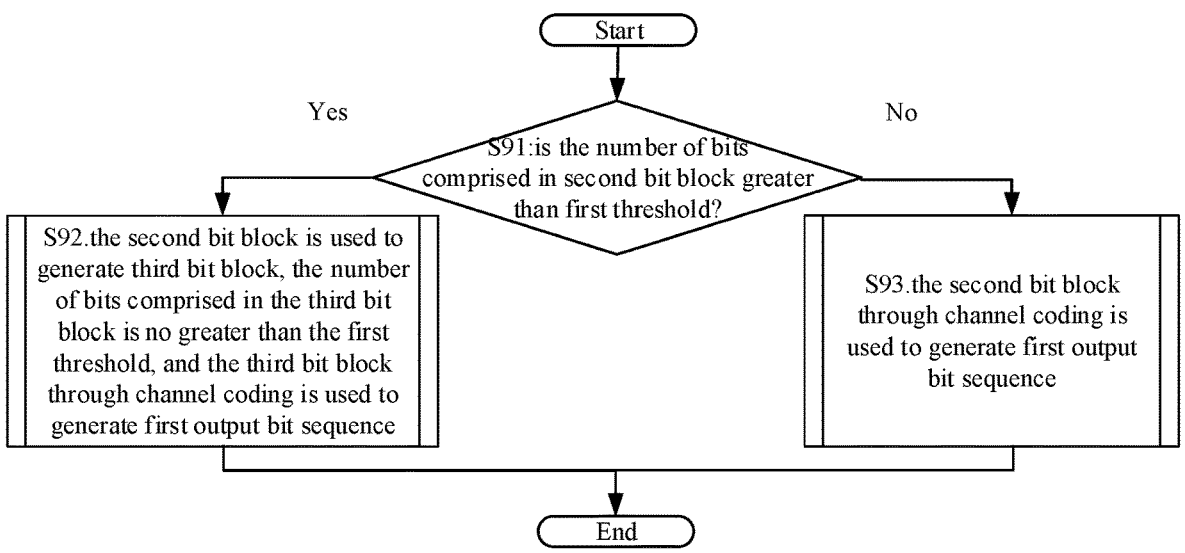
FIG. 9 illustrates a schematic diagram of a procedure of determining a way in which a second bit block is used to generate a first output bit sequence according to one embodiment of the present disclosure.

Embodiment 9 illustrates a schematic diagram of a procedure of determining a way in which a second bit block is used to generate a first output bit sequence according to one embodiment of the present disclosure, as shown in FIG. 9.

In Embodiment 9, the first node in the present disclosure determines in step S91 whether the number of bits comprised in the second bit block is greater than the first threshold; if so, it proceeds to step S92 to determine that the second bit block is used to generate a third bit block, a number of bits comprised in the third bit block is no greater than the first threshold, and the third bit block through channel coding is used to generate the first output bit sequence; otherwise, it proceeds to step S93 to determine that the second bit block through channel coding is used to generate the first output bit sequence.

In one embodiment, a total number of bits comprised in the third bit block is smaller than a total number of bits comprised in the second bit block.

In one embodiment, the phrase that the second bit block is used to generate the third bit block includes a meaning that: the third bit block is a bit sub-block in the second bit block.

In one embodiment, the phrase that the second bit block is used to generate the third bit block includes a meaning that: the third bit block is a bit block obtained by compression of at least partial bits in the second bit block.

In one embodiment, the phrase that the second bit block is used to generate the third bit block includes a meaning that: the third bit block is an output by at least partial bits in the second bit block through at least one of logic conjunction (logic and), logic disjunction (logic or), exclusive OR (XOR), repetition, or deleting bits operations.

In one embodiment, the phrase that the second bit block is used to generate the third bit block includes a meaning that: the third bit block is an output by at least partial bits in the second bit block through at least one of repetition, or zero-padding operations.

In one embodiment, the phrase that the third bit block through channel coding is used to generate the first output bit sequence means that a bit sub-sequence of the first output bit sequence comprises an output by the third bit block sequentially through some or all of CRC Attachment, Segmentation, Code-block-level CRC Attachment, Channel Coding, Rate Matching, and Concatenation.

In one embodiment, the phrase that the third bit block through channel coding is used to generate the first output bit sequence means that a bit sub-sequence of the first output bit sequence comprises an output by the third bit block sequentially through some or all of Channel Coding, Rate Matching, and Concatenation.

In one embodiment, the phrase that the third bit block through channel coding is used to generate the first output bit sequence means that an output by the third bit block through channel coding is used to generate a bit sub-sequence of the first output bit sequence.

In one embodiment, the phrase that the second bit block through channel coding is used to generate the first output bit sequence means that a bit sub-sequence of the first output bit sequence comprises an output by the second bit block sequentially through some or all of CRC Attachment, Segmentation, Code-block-level CRC Attachment, Channel Coding, Rate Matching, and Concatenation.

In one embodiment, the phrase that the second bit block through channel coding is used to generate the first output bit sequence means that a bit sub-sequence of the first output bit sequence comprises an output by the second bit block sequentially through some or all of Channel Coding, Rate Matching, and Concatenation.

In one embodiment, the phrase that the second bit block through channel coding is used to generate the first output bit sequence means that an output by the second bit block through channel coding is used to generate a bit sub-sequence of the first output bit sequence.

Embodiment 10

Embodiment 10 illustrates a schematic diagram illustrating a starting PRB occupied by a first signal in frequency domain according to one embodiment of the present disclosure, as shown in FIG. 10.

In Embodiment 10, a starting PRB occupied by the first signal in frequency domain is related to a first parameter value, or, a starting PRB occupied by the first signal in frequency domain is related to a number of bits comprised in a second bit block.

In one embodiment, the first parameter value is used to determine a starting PRB occupied by the first signal in frequency domain.

In one embodiment, a number of bits comprised in the second bit block is used to determine a starting PRB occupied by the first signal in frequency domain.

In one embodiment, multiple value ranges respectively correspond to multiple offset values; a difference between an index for a starting PRB occupied by the first signal in frequency domain and an index for a starting PRB occupied by the first radio resource pool in frequency domain is equal to an offset value among the multiple offset values corresponding to a value range to which the first parameter value belongs among the multiple value ranges.

In one embodiment, multiple value ranges respectively correspond to multiple offset values; a difference between an index for a starting PRB occupied by the first signal in frequency domain and an index for a starting PRB occupied by the first radio resource pool in frequency domain is equal to an offset value among the multiple offset values corresponding to a value range to which the number of bits comprised in the second bit block belongs among the multiple value ranges.

In one embodiment, multiple value ranges respectively correspond to multiple offset values; a difference between an index for a starting PRB occupied by the first signal in a hop in frequency domain and an index for a starting PRB occupied by the first radio resource pool in the hop in frequency domain is equal to an offset value among the multiple offset values corresponding to a value range to which the first parameter value belongs among the multiple value ranges.

In one embodiment, multiple value ranges respectively correspond to multiple offset values; a difference between an index for a starting PRB occupied by the first signal in a hop in frequency domain and an index for a starting PRB occupied by the first radio resource pool in the hop in frequency domain is equal to an offset value among the multiple offset values corresponding to a value range to which the number of bits comprised in the second bit block belongs among the multiple value ranges.

In one embodiment, the multiple offset values include 0.

In one embodiment, the multiple offset values include 1.

In one embodiment, the multiple offset values include a non-negative integer no greater than 65536.

In one embodiment, the correspondence relationship between the multiple value ranges and the multiple offset values is pre-defined.

In one embodiment, the correspondence relationship between the multiple value ranges and the multiple offset values is configurable.

In one embodiment, any two value ranges among the multiple value ranges are non-overlapping with each other.

Embodiment 11

Embodiment 11 illustrates a schematic diagram of a relation between a first node/first receiver and a first signaling according to one embodiment of the present disclosure, as shown in FIG. 11.

In Embodiment 11, the first node/first receiver in the present disclosure also receives a first signaling; herein, the first radio resource pool in the present disclosure belongs to a first radio resource pool set, the first radio resource pool set comprising at least one radio resource pool, the first signaling is used to determine the first radio resource pool from the first radio resource pool set; the first radio resource pool set is one of X2 candidate radio resource pool sets, X2 being a positive integer greater than 1; the first information block in the present disclosure is used to determine the X2 candidate radio resource pool sets; at least one of a number of bits comprised in the first bit block in the present disclosure or a number of bits comprised in the second bit block in the present disclosure is used to determine the first radio resource pool set out of the X2 candidate radio resource pool sets.

In one embodiment, the first signaling is dynamically configured.

In one embodiment, the first signaling comprises a layer 1 (L1) signaling.

In one embodiment, the first signaling comprises a layer 1 (L1) control signaling.

In one embodiment, the first signaling comprises a Physical Layer signaling.

In one embodiment, the first signaling comprises one or more fields in a physical layer signaling.

In one embodiment, the first signaling comprises a Higher Layer signaling.

In one embodiment, the first signaling comprises one or more fields in a Higher Layer signaling.

In one embodiment, the first signaling comprises a Radio Resource Control (RRC) signaling.

In one embodiment, the first signaling comprises a Medium Access Control layer Control Element (MAC CE) signaling.

In one embodiment, the first signaling comprises one or more fields in an RRC signaling.

In one embodiment, the first signaling comprises one or more fields in a MAC CE signaling.

In one embodiment, the first signaling comprises Downlink Control Information (DCI).

In one embodiment, the first signaling comprises one or more fields in a DCI.

In one embodiment, the first signaling is a DCI.

In one embodiment, the first signaling comprises Sidelink Control Information (SCI).

In one embodiment, the first signaling comprises one or more fields in an SCI.

In one embodiment, the first signaling comprises one or more fields in an Information Element (IE).

In one embodiment, the first signaling is a DownLink Grant Signaling.

In one embodiment, the first signaling is an UpLink Grant Signaling.

In one embodiment, the first signaling is transmitted in a downlink physical layer control channel (i.e., a downlink channel only capable of bearing physical layer signaling).

In one embodiment, the downlink physical layer control channel is a Physical Downlink Control CHannel (PDCCH).

In one embodiment, the downlink physical layer control channel is a short PDCCH (sPDCCH).

In one embodiment, the downlink physical layer control channel is a Narrow Band PDCCH (NB-PDCCH).

In one embodiment, the first signaling is DCI format 1_0, for the specific definition of the DCI format 1_0, refer to 3GPP TS38.212, Chapter 7.3.1.2.

In one embodiment, the first signaling is DCI format 1_1, for the specific definition of the DCI format 1_1, refer to 3GPP TS38.212, Chapter 7.3.1.2.

In one embodiment, the first signaling is DCI format 1_2, for the specific definition of the DCI format 1_2, refer to 3GPP TS38.212, Chapter 7.3.1.2.

In one embodiment, the first signaling is DCI format 0_0, for the specific definition of the DCI format 0_0, refer to 3GPP TS38.212, Chapter 7.3.1.1.

In one embodiment, the first signaling is DCI format 0_1, for the specific definition of the DCI format 0_1, refer to 3GPP TS38.212, Chapter 7.3.1.1.

In one embodiment, the first signaling is DCI format 0_2, for the specific definition of the DCI format 0_2, refer to 3GPP TS38.212, Chapter 7.3.1.1.

In one embodiment, the first signaling indicates a PDSCH transmission, the first bit block comprises a HARQ-ACK information bit corresponding to the PDSCH.

In one embodiment, the first signaling indicates a PDSCH transmission, the second bit block comprises a HARQ-ACK information bit corresponding to the PDSCH.

In one embodiment, the first information block in the present disclosure indicates the X2 candidate radio resource pool sets.

In one embodiment, a field comprised by the first information block in the present disclosure configures the X2 candidate radio resource pool sets.

In one embodiment, the statement in the claims that "at least one of a number of bits comprised in the first bit block in the present disclosure or a number of bits comprised in the second bit block in the present disclosure is used to determine the first radio resource pool set out of the X2 candidate radio resource pool sets" means that: the number of bits comprised in the first bit block and the first parameter value are jointly used to determine the first radio resource pool set out of the X2 candidate radio resource pool sets.

In one subembodiment of the above embodiment, X2 number ranges respectively correspond to the X2 candidate radio resource pool sets, a sum of the number of bits comprised in the first bit block and the first parameter value belongs to a first number range of the X2 number ranges, the first radio resource pool set being a radio resource pool corresponding to the first number range among the X2 candidate radio resource pool sets.

In one subembodiment of the above embodiment, X2 number ranges respectively correspond to the X2 candidate radio resource pool sets, a sum of the number of bits comprised in the first bit block, a number of corresponding CRC bits, and the first parameter value belongs to a first number range of the X2 number ranges, the first radio resource pool set being a radio resource pool corresponding to the first number range among the X2 candidate radio resource pool sets.

In one embodiment, the statement in the claims that "at least one of a number of bits comprised in the first bit block in the present disclosure or a number of bits comprised in the second bit block in the present disclosure is used to determine the first radio resource pool set out of the X2 candidate radio resource pool sets" means that: a sum of the number of bits comprised in the first bit block and the number of bits comprised in the second bit block (or a bit block generated by the second bit block) are jointly used to determine the first radio resource pool set out of the X2 candidate radio resource pool sets.

In one subembodiment of the above embodiment, X2 number ranges respectively correspond to the X2 candidate radio resource pool sets, a sum of the number of bits comprised in the first bit block and the number of bits comprised in the second bit block (or a bit block generated by the second bit block) belongs to a first number range of the X2 number ranges, the first radio resource pool set being a radio resource pool corresponding to the first number range among the X2 candidate radio resource pool sets.

In one subembodiment of the above embodiment, X2 number ranges respectively correspond to the X2 candidate radio resource pool sets, a sum of the number of bits comprised in the first bit block, the number of bits comprised in the second bit block (or a bit block generated by the second bit block) and a number of corresponding CRC bits belongs to a first number range of the X2 number ranges, the first radio resource pool set being a radio resource pool corresponding to the first number range among the X2 candidate radio resource pool sets.

In one embodiment, the statement in the claims that "at least one of a number of bits comprised in the first bit block in the present disclosure or a number of bits comprised in the second bit block in the present disclosure is used to determine the first radio resource pool set out of the X2 candidate radio resource pool sets" means that: the number of bits comprised in the first bit block, the first parameter value in the present disclosure and the first code rate in the present disclosure are jointly used to determine the first radio resource pool set out of the X2 candidate radio resource pool sets.

In one embodiment, the statement in the claims that "at least one of a number of bits comprised in the first bit block in the present disclosure or a number of bits comprised in the second bit block in the present disclosure is used to determine the first radio resource pool set out of the X2 candidate radio resource pool sets" means that: the number of bits comprised in the first bit block and the first threshold in the present disclosure are jointly used to determine the first radio resource pool set out of the X2 candidate radio resource pool sets.

In one embodiment, the first information block in the present disclosure is used to determine X3 candidate radio resource pools, where X3 is a positive integer greater than 1; at least one of a number of bits comprised in the first bit block in the present disclosure or a number of bits comprised in the second bit block in the present disclosure is used to determine the first radio resource pool out of the X3 candidate radio resource pools.

In one embodiment, the statement in the claims that "at least one of a number of bits comprised in the first bit block in the present disclosure or a number of bits comprised in the second bit block in the present disclosure is used to determine the first radio resource pool out of the X3 candidate radio resource pools" means that: a sum of the number of bits comprised in the first bit block and the first parameter value is used to indicate the first radio resource pool from the X3 candidate radio resource pools.

In one embodiment, the statement in the claims that "at least one of a number of bits comprised in the first bit block in the present disclosure or a number of bits comprised in the second bit block in the present disclosure is used to determine the first radio resource pool out of the X3 candidate radio resource pools" means that: the number of bits comprised in the first bit block, the first parameter value in the present disclosure and the first code rate in the present disclosure are jointly used to indicate the first radio resource pool from the X3 candidate radio resource pools.

In one embodiment, the statement in the claims that "at least one of a number of bits comprised in the first bit block in the present disclosure or a number of bits comprised in the second bit block in the present disclosure is used to determine the first radio resource pool out of the X3 candidate radio resource pools" means that: a sum of the number of bits comprised in the first bit block and the number of bits comprised in the second bit block (or a bit block generated by the second bit block) is used to indicate the first radio resource pool from the X3 candidate radio resource pools.

Embodiment 12

Embodiment 12 illustrates a structure block diagram of a processing device in a first node, as shown in FIG. 12. In FIG. 12, a processing device 1200 in the first node is comprised of a first receiver 1201 and a first transmitter 1202.

In one embodiment, the first node 1200 is a UE.

In one embodiment, the first node 1200 is a relay node.

In one embodiment, the first node 1200 is vehicle-mounted communication equipment.

In one embodiment, the first node 1200 is a UE supporting V2X communications.

In one embodiment, the first node 1200 is a relay node supporting V2X communications.

In one embodiment, the first receiver 1201 comprises at least one of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1201 comprises at least the first five of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201 comprises at least the first four of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201 comprises at least the first three of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201 comprises at least the first two of the antenna 452, the receiver 454, the multi-antenna receiving processor 458, the receiving processor 456, the controller/processor 459, the memory 460 and the data source 467 in FIG. 4 of the present disclosure.

In one embodiment, the first transmitter 1202 comprises at least one of the antenna 452, the transmitter 454, the multi-antenna transmitting processor 457, the transmitting processor 468, the controller/processor 459, the memory 460 or the data source 467 in FIG. 4 of the present disclosure.

In one embodiment, the first transmitter 1202 comprises at least the first five of the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1202 comprises at least the first four of the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1202 comprises at least the first three of the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1202 comprises at least the first two of the antenna 452, the transmitter 454, the multi-antenna transmitting processor 457, the transmitting processor 468, the controller/processor 459, the memory 460 and the data source 467 in FIG. 4 of the present disclosure.

In Embodiment 12, the first receiver 1201 receives a first information block, the first information block being used to determine a first radio resource pool and a first code rate, the first code rate being a non-negative number; the first transmitter 1202 transmits a first signal, the first signal being used to carry a first bit block and a second bit block, the first bit block comprising at least one control information bit, the second bit block comprising at least one control information bit; herein, a radio resource occupied by the first signal belongs to the first radio resource pool, a number of physical resource blocks (PRBs) occupied by the first signal in frequency domain is equal to a first number, the first number being no greater than a number of PRBs comprised by the first radio resource pool in frequency domain; control information bit(s) comprised by the first bit block and control information bit(s) comprised by the second bit block are of different types; a number of bits (bit size) comprised in the first bit block, a first parameter value and the first code rate are jointly used to determine the first number, the first parameter value being a non-negative number which is pre-defined or configurable; the first bit block and the second bit block are jointly used to generate a first output bit sequence, the first output bit sequence comprising multiple bits; a number of bits comprised in the first output bit sequence is linear with the first number.

In one embodiment, the number of bits comprised in the first bit block is used together with the first parameter value to determine a first amount of calculation, while a second number is used to determine a third amount of calculation, the first amount of calculation being no greater than the third amount of calculation; the second number is no greater than a number of PRBs comprised by the first radio resource pool in frequency domain, or, the second number is determined by the first information block; the first number is related to the first amount of calculation.

In one embodiment, a priority index for control information bit(s) comprised by the first bit block is equal to a first index, while a priority index for control information bit(s) comprised by the second bit block is equal to a second index, where the first index is a non-negative integer, and the second index is a non-negative integer; the first index and the second index are unequal, a sum of the number of control information bit(s) comprised by the first bit block and the number of control information bit(s) comprised by the second bit block is greater than 2.

In one embodiment, the first parameter value is equal to one of X1 candidate parameter values, X1 being a positive integer greater than 1; a given parameter value is equal to one of the X1 candidate parameter values, the first parameter value and the given parameter value being unequal is used to determine that the first signal carries the first bit block and the second bit block.

In one embodiment, a relative magnitude between the number of bits comprised in the second bit block and a first threshold is used to determine a way in which the second bit block is used to generate the first output bit sequence, where the first threshold is a non-negative integer; the first threshold is pre-defined, or the first threshold is configurable, or the first threshold is related to the first parameter value.

In one embodiment, when the number of bits comprised in the second bit block is greater than the first threshold, the second bit block is used to generate a third bit block, a number of bits comprised in the third bit block is no greater than the first threshold, and the third bit block through channel coding is used to generate the first output bit sequence; when the number of bits comprised in the second bit block is greater than the first threshold, the second bit block through channel coding is used to generate the first output bit sequence.

In one embodiment, a starting PRB occupied by the first signal in frequency domain is related to the first parameter value, or, a starting PRB occupied by the first signal in frequency domain is related to a number of bits comprised in the second bit block.

In one embodiment, the first receiver 1201 also receives a first signaling; herein, the first radio resource pool belongs to a first radio resource pool set, the first radio resource pool set comprising at least one radio resource pool, the first signaling is used to determine the first radio resource pool from the first radio resource pool set; the first radio resource pool set is one of X2 candidate radio resource pool sets, X2 being a positive integer greater than 1; the first information block is used to determine the X2 candidate radio resource pool sets; at least one of a number of bits comprised in the first bit block or a number of bits comprised in the second bit block is used to determine the first radio resource pool set out of the X2 candidate radio resource pool sets.

Embodiment 13

Embodiment 13 illustrates a structure block diagram a processing device in a second node according to one embodiment of the present disclosure, as shown in FIG. 13. In FIG. 13, a processing device 1300 in the second node is comprised of a second transmitter 1301 and a second receiver 1302.

In one embodiment, the second node 1300 is a UE.

In one embodiment, the second node 1300 is a base station.

In one embodiment, the second node 1300 is a relay node.

In one embodiment, the second node 1300 is vehicle-mounted communication equipment.

In one embodiment, the second node 1300 is UE supporting V2X communications.

In one embodiment, the second transmitter 1301 comprises at least one of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first five of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301 comprises at least the first four of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301 comprises at least the first three of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301 comprises at least the first two of the antenna 420, the transmitter 418, the multi-antenna transmitting processor 471, the transmitting processor 416, the controller/processor 475 and the memory 476 in FIG. 4 of the present disclosure.

In one embodiment, the second receiver 1302 comprises at least one of the antenna 420, the receiver 418, the multi-antenna receiving processor 472, the receiving processor 470, the controller/processor 475 or the memory 476 in FIG. 4 of the present disclosure.

In one embodiment, the second receiver 1302 comprises at least the first five of the antenna 420, the receiver 418, the multi-antenna receiving processor 472, the receiving processor 470, the controller/processor 475 and the memory 476 in FIG. 4 of the present disclosure.

In one embodiment, the second receiver 1302 comprises at least the first four of the antenna 420, the receiver 418, the multi-antenna receiving processor 472, the receiving processor 470, the controller/processor 475 and the memory 476 in FIG. 4 of the present disclosure.

In one embodiment, the second receiver 1302 comprises at least the first three of the antenna 420, the receiver 418, the multi-antenna receiving processor 472, the receiving processor 470, the controller/processor 475 and the memory 476 in FIG. 4 of the present disclosure.

In one embodiment, the second receiver 1302 comprises at least the first two of the antenna 420, the receiver 418, the multi-antenna receiving processor 472, the receiving processor 470, the controller/processor 475 and the memory 476 in FIG. 4 of the present disclosure.

In Embodiment 13, the second transmitter 1301 transmits a first information block, the first information block being used to determine a first radio resource pool and a first code rate, the first code rate being a non-negative number; the second receiver 1302 receives a first signal, the first signal being used to carry a first bit block and a second bit block, the first bit block comprising at least one control information bit, the second bit block comprising at least one control information bit; herein, a radio resource occupied by the first signal belongs to the first radio resource pool, a number of physical resource blocks (PRBs) occupied by the first signal in frequency domain is equal to a first number, the first number being no greater than a number of PRBs comprised by the first radio resource pool in frequency domain; control information bit(s) comprised by the first bit block and control information bit(s) comprised by the second bit block are of different types; a number of bits (bit size) comprised in the first bit block, a first parameter value and the first code rate are jointly used to determine the first number, the first parameter value being a non-negative number which is pre-defined or configurable; the first bit block and the second bit block are jointly used to generate a first output bit sequence, the first output bit sequence comprising multiple bits; a number of bits comprised in the first output bit sequence is linear with the first number.

In one embodiment, the number of bits comprised in the first bit block is used together with the first parameter value to determine a first amount of calculation, while a second number is used to determine a third amount of calculation, the first amount of calculation being no greater than the third amount of calculation; the second number is no greater than a number of PRBs comprised by the first radio resource pool in frequency domain, or, the second number is determined by the first information block; the first number is related to the first amount of calculation.

In one embodiment, a priority index for control information bit(s) comprised by the first bit block is equal to a first index, while a priority index for control information bit(s) comprised by the second bit block is equal to a second index, where the first index is a non-negative integer, and the second index is a non-negative integer; the first index and the second index are unequal, a sum of the number of control information bit(s) comprised by the first bit block and the number of control information bit(s) comprised by the second bit block is greater than 2.

In one embodiment, the first parameter value is equal to one of X1 candidate parameter values, X1 being a positive integer greater than 1; a given parameter value is equal to one of the X1 candidate parameter values, the first parameter value and the given parameter value being unequal is used to determine that the first signal carries the first bit block and the second bit block.

In one embodiment, a relative magnitude between the number of bits comprised in the second bit block and a first threshold is used to determine a way in which the second bit block is used to generate the first output bit sequence, where the first threshold is a non-negative integer; the first threshold is pre-defined, or the first threshold is configurable, or the first threshold is related to the first parameter value.

In one embodiment, when the number of bits comprised in the second bit block is greater than the first threshold, the second bit block is used to generate a third bit block, a number of bits comprised in the third bit block is no greater than the first threshold, and the third bit block through channel coding is used to generate the first output bit sequence; when the number of bits comprised in the second bit block is greater than the first threshold, the second bit block through channel coding is used to generate the first output bit sequence.

In one embodiment, a starting PRB occupied by the first signal in frequency domain is related to the first parameter value, or, a starting PRB occupied by the first signal in frequency domain is related to a number of bits comprised in the second bit block.

In one embodiment, the second transmitter 1301 also transmits a first signaling; herein, the first radio resource pool belongs to a first radio resource pool set, the first radio resource pool set comprising at least one radio resource pool, the first signaling is used to determine the first radio resource pool from the first radio resource pool set; the first radio resource pool set is one of X2 candidate radio resource pool sets, X2 being a positive integer greater than 1; the first information block is used to determine the X2 candidate radio resource pool sets; at least one of a number of bits comprised in the first bit block or a number of bits comprised in the second bit block is used to determine the first radio resource pool set out of the X2 candidate radio resource pool sets.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, test apparatus, test equipment or test instrument, and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first node for wireless communications, comprising:
a first receiver, receiving a first information block, the first information block being used to determine a first radio resource pool and a first code rate, where the first code rate is a non-negative number; and
a first transmitter, transmitting a first signal, the first signal being used to carry a first bit block and a second bit block, the first bit block comprising at least one control information bit, the second bit block comprising at least one control information bit;
wherein a radio resource occupied by the first signal belongs to the first radio resource pool, a number of physical resource blocks (PRBs) occupied by the first signal in frequency domain is equal to a first number, the first number being no greater than a number of PRBs comprised in the first radio resource pool in frequency domain; control information bit(s) comprised in the first bit block and control information bit(s) comprised in the second bit block are of different types; a number of bits (bit size) comprised in the first bit block, a first parameter value and the first code rate are jointly used to determine the first number, the first parameter value being a non-negative number which is pre-defined or configurable; the first bit block and the second bit block are jointly used to generate a first output bit sequence, the first output bit sequence comprising multiple bits; a number of bits comprised in the first output bit sequence is linear with the first number.

2. The first node according to claim 1, wherein the number of bits comprised in the first bit block is used together with the first parameter value to determine a first amount of calculation, while a second number is used to determine a third amount of calculation, the first amount of calculation being no greater than the third amount of calculation; the second number is no greater than a number of PRBs comprised in the first radio resource pool in frequency domain, or, the second number is determined by the first information block; the first number is related to the first amount of calculation.

3. The first node according to claim 1, wherein the number of bits comprised in the first bit block is used together with the first parameter value to determine a first amount of calculation; the first number is related to the first amount of calculation.

4. The first node according to claim 3, wherein the first number is equal to a minimum number in a first number set which, multiplied by a first subcarrier number, a first UCI symbol number, a first modulation order and the first code rate, yields a product no less than the first amount of calculation, a maximum number in the first number set is no greater than a second number; the second number is equal to a number of PRBs comprised in the first radio resource pool in frequency domain; the first amount of calculation is equal to the number of bits comprised in the first bit block plus the first parameter value.

5. The first node according to claim 1, wherein a number of bits comprised in the second bit block is greater than the first parameter value.

6. The first node according to claim 1, wherein a priority index for control information bit(s) comprised in the first bit block is equal to a first index, while a priority index for control information bit(s) comprised in the second bit block is equal to a second index, where the first index is a non-negative integer, and the second index is a non-negative integer; the first index and the second index are unequal, a sum of the number of control information bit(s) comprised in the first bit block and the number of control information bit(s) comprised in the second bit block is greater than 2.

7. The first node according to claim 1, wherein the first parameter value is equal to one of X1 candidate parameter values, X1 being a positive integer greater than 1; a given parameter value is equal to one of the X1 candidate parameter values, the first parameter value and the given parameter value being unequal is used to determine that the first signal carries the first bit block and the second bit block;
   or, wherein a relative magnitude between the number of bits comprised in the second bit block and a first threshold is used to determine a way in which the second bit block is used to generate the first output bit sequence, where the first threshold is a non-negative integer; the first threshold is pre-defined, or the first threshold is configurable, or the first threshold is related to the first parameter value;
   or, wherein when the number of bits comprised in the second bit block is greater than the first threshold, the second bit block is used to generate a third bit block, a number of bits comprised in the third bit block is no greater than the first threshold, and the third bit block through channel coding is used to generate the first output bit sequence; when the number of bits comprised in the second bit block is no greater than the first threshold, the second bit block through channel coding is used to generate the first output bit sequence;
   or, wherein a starting PRB occupied by the first signal in frequency domain is related to the first parameter value, or, a starting PRB occupied by the first signal in frequency domain is related to a number of bits comprised in the second bit block;
   or, wherein the first code rate is no greater than 1, and the first code rate is used to determine the first parameter value.

8. A second node for wireless communications, comprising:
   a second transmitter, transmitting a first information block, the first information block being used to determine a first radio resource pool and a first code rate, where the first code rate is a non-negative number; and
   a second receiver, receiving a first signal, the first signal being used to carry a first bit block and a second bit block, the first bit block comprising at least one control information bit, the second bit block comprising at least one control information bit;
   wherein a radio resource occupied by the first signal belongs to the first radio resource pool, a number of physical resource blocks (PRBs) occupied by the first signal in frequency domain is equal to a first number, the first number being no greater than a number of PRBs comprised in the first radio resource pool in frequency domain; control information bit(s) comprised in the first bit block and control information bit(s) comprised in the second bit block are of different types; a number of bits (bit size) comprised in the first bit block, a first parameter value and the first code rate are jointly used to determine the first number, the first parameter value being a non-negative number which is pre-defined or configurable; the first bit block and the second bit block are jointly used to generate a first output bit sequence, the first output bit sequence comprising multiple bits; a number of bits comprised in the first output bit sequence is linear with the first number.

9. The second node according to claim 8, wherein the number of bits comprised in the first bit block is used together with the first parameter value to determine a first amount of calculation, while a second number is used to determine a third amount of calculation, the first amount of calculation being no greater than the third amount of calculation; the second number is no greater than a number of PRBs comprised in the first radio resource pool in frequency domain, or, the second number is determined by the first information block; the first number is related to the first amount of calculation.

10. The second node according to claim 8, wherein the number of bits comprised in the first bit block is used together with the first parameter value to determine a first amount of calculation; the first number is related to the first amount of calculation.

11. The second node according to claim 10, wherein the first number is equal to a minimum number in a first number set which, multiplied by a first subcarrier number, a first UCI symbol number, a first modulation order and the first code rate, yields a product no less than the first amount of calculation, a maximum number in the first number set is no greater than a second number; the second number is equal to a number of PRBs comprised in the first radio resource pool in frequency domain; the first amount of calculation is equal to the number of bits comprised in the first bit block plus the first parameter value.

12. The second node according to claim 8, wherein a number of bits comprised in the second bit block is greater than the first parameter value.

13. The second node according to claim 8, wherein a priority index for control information bit(s) comprised in the first bit block is equal to a first index, while a priority index for control information bit(s) comprised in the second bit block is equal to a second index, where the first index is a non-negative integer, and the second index is a non-negative integer; the first index and the second index are unequal, a sum of the number of control information bit(s) comprised in the first bit block and the number of control information bit(s) comprised in the second bit block is greater than 2.

14. A method in a first node for wireless communications, comprising:
   receiving a first information block, the first information block being used to determine a first radio resource pool and a first code rate, where the first code rate is a non-negative number; and
   transmitting a first signal, the first signal being used to carry a first bit block and a second bit block, the first bit block comprising at least one control information bit, the second bit block comprising at least one control information bit;
   wherein a radio resource occupied by the first signal belongs to the first radio resource pool, a number of physical resource blocks (PRBs) occupied by the first signal in frequency domain is equal to a first number, the first number being no greater than a number of PRBs comprised in the first radio resource pool in frequency domain; control information bit(s) comprised in the first bit block and control information bit(s) comprised in the second bit block are of different types; a number of bits (bit size) comprised in the first bit block, a first parameter value and the first code rate are jointly used to determine the first number, the first parameter value being a non-negative number which is pre-defined or configurable; the first bit block and the second bit block are jointly used to generate a first output bit sequence, the first output bit sequence comprising multiple bits; a number of bits comprised in the first output bit sequence is linear with the first number.

15. The method in the first node according to claim 14, wherein the number of bits comprised in the first bit block is used together with the first parameter value to determine a first amount of calculation, while a second number is used to determine a third amount of calculation, the first amount of calculation being no greater than the third amount of calculation; the second number is no greater than a number of PRBs comprised in the first radio resource pool in frequency domain, or, the second number is determined by the first information block; the first number is related to the first amount of calculation.

16. The method in the first node according to claim 14, wherein the number of bits comprised in the first bit block is used together with the first parameter value to determine a first amount of calculation; the first number is related to the first amount of calculation.

17. The method in the first node according to claim 16, wherein the first number is equal to a minimum number in a first number set which, multiplied by a first subcarrier number, a first UCI symbol number, a first modulation order and the first code rate, yields a product no less than the first amount of calculation, a maximum number in the first number set is no greater than a second number; the second number is equal to a number of PRBs comprised in the first radio resource pool in frequency domain; the first amount of calculation is equal to the number of bits comprised in the first bit block plus the first parameter value.

18. The method in the first node according to claim 14, wherein a number of bits comprised in the second bit block is greater than the first parameter value.

19. The method in the first node according to claim 14, wherein a priority index for control information bit(s) comprised in the first bit block is equal to a first index, while a priority index for control information bit(s) comprised in the second bit block is equal to a second index, where the first index is a non-negative integer, and the second index is a non-negative integer; the first index and the second index are unequal, a sum of the number of control information bit(s) comprised in the first bit block and the number of control information bit(s) comprised in the second bit block is greater than 2.

20. The method in the first node according to claim 14, wherein the first parameter value is equal to one of X1 candidate parameter values, X1 being a positive integer greater than 1; a given parameter value is equal to one of the X1 candidate parameter values, the first parameter value and the given parameter value being unequal is used to determine that the first signal carries the first bit block and the second bit block;
  or, wherein a relative magnitude between the number of bits comprised in the second bit block and a first threshold is used to determine a way in which the second bit block is used to generate the first output bit sequence, where the first threshold is a non-negative integer; the first threshold is pre-defined, or the first threshold is configurable, or the first threshold is related to the first parameter value;
  or, wherein when the number of bits comprised in the second bit block is greater than the first threshold, the second bit block is used to generate a third bit block, a number of bits comprised in the third bit block is no greater than the first threshold, and the third bit block through channel coding is used to generate the first output bit sequence; when the number of bits comprised in the second bit block is no greater than the first threshold, the second bit block through channel coding is used to generate the first output bit sequence;
  or, wherein a starting PRB occupied by the first signal in frequency domain is related to the first parameter value, or, a starting PRB occupied by the first signal in frequency domain is related to a number of bits comprised in the second bit block;
  or, wherein the first code rate is no greater than 1, and the first code rate is used to determine the first parameter value.

* * * * *